US011143569B2

(12) United States Patent
Neal, III et al.

(10) Patent No.: US 11,143,569 B2
(45) Date of Patent: Oct. 12, 2021

(54) PRE-JOB OPERATION VALVE CHECKS

(71) Applicant: Halliburton Energy Services, Inc., Houston, TX (US)

(72) Inventors: Charles E. Neal, III, Duncan, OK (US); James D. Funkhouser, Duncan, OK (US); Derek Williams, Duncan, OK (US); Gary L. Cline, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 371 days.

(21) Appl. No.: 15/754,427

(22) PCT Filed: Oct. 2, 2015

(86) PCT No.: PCT/US2015/053866
§ 371 (c)(1),
(2) Date: Feb. 22, 2018

(87) PCT Pub. No.: WO2017/058263
PCT Pub. Date: Apr. 6, 2017

(65) Prior Publication Data
US 2018/0245447 A1  Aug. 30, 2018

(51) Int. Cl.
*G01M 3/28* (2006.01)
*G06Q 10/06* (2012.01)
*E21B 47/00* (2012.01)
G06Q 50/00 (2012.01)
E21B 33/14 (2006.01)
E21B 43/26 (2006.01)

(52) U.S. Cl.
CPC .......... *G01M 3/2876* (2013.01); *E21B 47/00* (2013.01); *G06Q 10/06* (2013.01); *E21B 33/14* (2013.01); *E21B 43/26* (2013.01); *G06Q 50/00* (2013.01)

(58) Field of Classification Search
None
See application file for complete search history.

(56) References Cited

U.S. PATENT DOCUMENTS 3,865,142 A * 2/1975 Begun ................ E21B 33/0355
                                                       137/635
5,132,904 A    7/1992 Lamp
5,329,465 A    7/1994 Arcella et al.
(Continued)

OTHER PUBLICATIONS

International Search Report and The Written Opinion of the International Search Authority, dated Jun. 29, 2016, PCT/US2015/053866, 12 pages, ISA/KR.

*Primary Examiner* — Santosh R Poudel

(57) ABSTRACT

An example method of performing a valve check on a plurality of valves utilized in a wellbore servicing operation includes identifying a set of valves to be checked from the plurality of valves. The method also includes simultaneously actuating each valve in the set to transition from a first position to a second position. The method further includes for each valve in the set, recording a first response time based on the transition from the first position to the second position and determining if the first response time for the valve exceeds a first predetermined upper threshold. The method also includes presenting a display of each valve in the set and an indication whether the first response time exceeds the first predetermined upper threshold.

25 Claims, 14 Drawing Sheets

(56) References Cited

U.S. PATENT DOCUMENTS

| | | | |
|---|---|---|---|
| 6,026,352 A | 2/2000 | Burns et al. | |
| 8,998,168 B2 | 4/2015 | Witkowski et al. | |
| 2005/0222772 A1 | 10/2005 | Koederitz et al. | |
| 2008/0097628 A1* | 4/2008 | Weatherhead | G05B 23/0256 700/54 |
| 2009/0095807 A1* | 4/2009 | Dickerson | G06Q 20/40 235/379 |
| 2011/0231024 A1 | 9/2011 | Medizade | |
| 2012/0227983 A1 | 9/2012 | Lymberopoulos et al. | |
| 2013/0180711 A1 | 7/2013 | Barrilleaux | |
| 2014/0151065 A1* | 6/2014 | Stephenson | E21B 21/106 166/374 |
| 2014/0238666 A1* | 8/2014 | Walton | E21B 34/06 166/250.01 |
| 2015/0165107 A1* | 6/2015 | Hedmann | G16H 20/40 604/29 |
| 2015/0378542 A1* | 12/2015 | Saito | G06F 3/0629 715/736 |
| 2016/0363500 A1* | 12/2016 | Franklin | G01L 19/083 |
| 2018/0333548 A1* | 11/2018 | Nadkarni | A61B 5/744 |

\* cited by examiner

400

| Dangerous Configurations | VALVE ARRANGEMENTS THAT IF SELECTED, NEED TO PREVENT OR WARN | | | | | | | |
|---|---|---|---|---|---|---|---|---|
| Running Pumps | valve numbers | 310 | 311 | 312 | 313 | 314 | 315 | 318 |
| PUMP 302 | SIDE 1 | X | O | X | O | O | O | O |
| | SIDE 2 | X | O | O | X | X | X | O |
| | SIDE 3 | X | O | O | X | X | O | X |
| | SIDE 4 | X | X | O | O | X | X | O |
| | SIDE 5 | X | X | O | O | X | O | X |
| PUMP 304 | SIDE 1 | O | X | O | X | O | O | O |
| | SIDE 2 | O | X | X | O | X | X | O |
| | SIDE 3 | O | X | X | O | X | O | X |
| | SIDE 4 | X | X | O | O | X | X | O |
| | SIDE 5 | X | X | O | O | X | O | X |
| TEST PUMP 328 | TEST PUMP 1 | O | O | X | X | X | X | O |
| | TEST PUMP 2 | O | O | X | X | X | O | X |
| | TEST PUMP 3 | O | X | X | O | X | X | O |
| | TEST PUMP 4 | O | X | X | O | X | O | X |
| | TEST PUMP 5 | X | X | O | O | X | X | O |
| | TEST PUMP 6 | X | X | O | O | X | O | X |
| | TEST PUMP 7 | X | O | O | X | X | X | O |
| | TEST PUMP 8 | X | O | O | X | X | O | X |

FIG. 4

PRE-JOB OPERATION VALVE CHECKS

PRIORITY

The present application is a U.S. National Stage patent application of International Patent Application No. PCT/US2015/053866, filed on Oct. 2, 2015, the benefit of which is claimed and the disclosure of which is incorporated herein by reference in its entirety.

FIELD

The present invention relates generally to pressure pumping operations, and particularly to valve configurations in wellbore drilling and processes.

BACKGROUND

High pressure pumps are used in many phases of the wellbore servicing operations. Such operations commonly involve the interconnection of various equipment such as pumps, blenders, solid material sources, water sources, chemical sources and the wellhead via one or more pipe manifolds. Each manifold typically may have a plurality of valves of varying types, such as proportional valves as well as on/off valves. Each operation may have a plurality of manifolds with multiple pumps supplying material such as solids and liquids, from multiple sources. Thus, any given operation may have dozens of valves associated with the operation.

Traditionally, an operator is charged with ascertaining the state of each valve and operating the equipment so as not to over pressurize any given component of the system. For example, it is undesirable to initiate pumping into a discharge manifold that does not have an open fluid flow path. This can result in a "deadhead" situation that could damage the manifold, valves or other equipment by over-pressuring. Likewise, a deadhead situation could occur when a system is pumping and one or more valves are operated (opened or closed) in a manner that would create an overpressured state. In either case, where a deadhead or over-pressuring situation occurs, the equipment involved must be taken off-line, inspected and if necessary, repaired, all of which can result in drilling and production delays, as applicable.

Even in systems where the large number of valves are controlled electronically, an operator is still charged with ascertaining the state of each valve and for timing actuation of each valve to accomplish a particular task, such as cementing, pumping or hydraulic fracturing. In many cases, given the large number of valves, the state of any one valve, the actuation of any one valve or the responsiveness of any one valve may be overlooked or simply not identified at all. In this same vein, typically, a particular operation dictates a particular valve configuration for the operation. This large number of valves must be set to the correct position by the operators. Commonly, each valve is individually set by the operator at the onset of an operation to coincide with the desired configuration for the particular operation. As the number of valves increases, the chances of improperly setting one or more valves in the desired configuration increases.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

FIG. 4 is an example table of overpressured states for valves in the discharge manifold of FIG. 3.

DETAILED DESCRIPTION OF THE INVENTION

Figure 1:
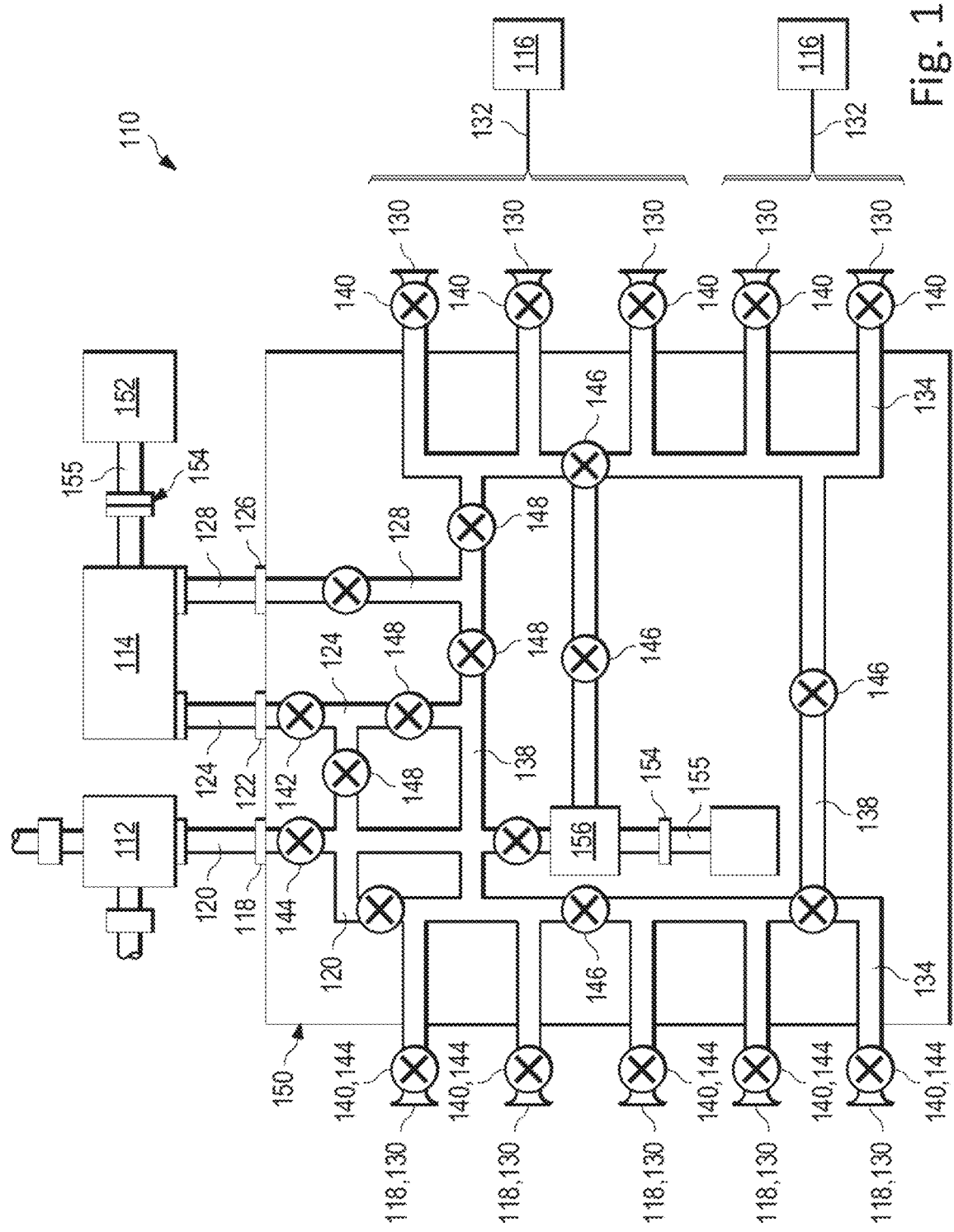
FIG. 1 is a schematic illustration of a high-pressure pumping system having a plurality of valves.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the Figures. The spatially relative terms are intended to encompass different orientations of the apparatus in use or operation in addition to the orientation depicted in the Figures. For example, if the apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Generally, in one or more embodiments, a method of servicing a request to manipulate a valve in a manifold system having a plurality of valves is provided wherein a plurality of valve configurations for the plurality of valves that would result in an overpressured manifold system is received; a request to manipulate a valve in the manifold system is received; it is determined whether a pump to the manifold system is operating; in response to a determination that the pump to the manifold system is operating, it is determined whether the proposed valve manipulation would inhibit a flow path between the pump and an outlet of the manifold system based on the received overpressured manifold system valve configurations; and in response to a determination that the proposed valve manipulation would inhibit the flow path and would result in an overpressured manifold system, the proposed valve manipulation is blocked. The system includes one or more processors in communication with a memory and operable to cause the system to: receive a plurality of valve configurations for the plurality of valves that would result in an overpressured manifold system; receive a request to manipulate a valve in the manifold system; determine whether a pump to the manifold system is operating; in response to a determination that the pump to the manifold system is operating, determine whether the proposed valve manipulation would inhibit a flow path between the pump and an outlet of the manifold system based on the received overpressured manifold system valve configurations; and in response to a determination that the proposed valve manipulation would inhibit the flow path and would result in an overpressured manifold system, block the proposed valve manipulation.

Generally, in one or more embodiments, a method of performing a valve check on a plurality of valves utilized in a wellbore servicing operation is provided, wherein a set of valves to be checked from plurality of valves is identified; each valve in the set is simultaneously actuated to transition from a first position to a second position; for each valve in the set, a first response time based on the transition from the first position to the second position is recorded and it is determined if the first response time for the valve exceeds a first predetermined upper threshold; and a display of each valve in the set and an indication whether the first response time exceeds the first predetermined upper threshold are presented. The system includes one or more processors in communication with a memory and operable to cause the system to: identify a set of valves to be checked from the plurality of valves; simultaneously actuate each valve within the set to transition from a first position to a second position; for each valve in the set, record a first response time based on the transition from the first position to the second position, and determine if the first response time for the valve exceeds a first predetermined upper threshold; and present a display of each valve in the set and an indication whether the first response time exceeds the predetermined upper threshold.

Generally, in one or more embodiments, a method of setting a plurality of valves into a predetermined configuration for use in a wellbore servicing operation is provided, wherein a schematic display of the plurality of valves is presented with a visual indication of the current state of each valve; a list of predefined valve configurations is displayed; and a predefined valve configuration selected from the list is overlaid on the schematic display the state of each valve if the predefined valve configuration is implemented is visually indicating on the overlay. The system includes one or more processors in communication with a memory and operable to cause the system to: present a schematic display of the plurality of valves with a visual indication of the current state of each valve; display a list of predefined valve configurations; and overlay on the schematic display a predefined valve configuration selected from the list and visually indicate on the overlay the state of each valve if the predefined valve configuration is implemented.

As used herein, the term "wellbore services manifold" includes a skid, truck and/or trailer comprising one or more manifolds for receiving, organizing, and/or distributing wellbore servicing fluids during wellbore servicing operations. Examples of such wellbore servicing operations include fracturing operations, acidizing operations, cementing operations, enhanced oil recovery operations and carbon dioxide injection operations. Fracturing operations are treatments performed on wells in low-permeability reservoirs. Fluids are pumped at high-pressure into the low-permeability reservoir interval to be treated, causing a vertical fracture to open in a formation. The wings of the fracture extend away from the wellbore in opposing directions according to the natural stresses within the formation. Proppants, such as grains of sand, are mixed with the fluid to keep the fracture open when the treatment is complete. Hydraulic fracturing creates high-conductivity communication with a large area of formation and bypasses any damage that may exist in the near-wellbore area. Cementing operations include cementing an annulus after a casing string has been run, cementing a lost circulation zone, cementing a void or a crack in a conduit, cementing a void or a crack in a cement sheath disposed in an annulus of a wellbore, cementing an opening between the cement sheath and the conduit, cementing an existing well from which to push off with directional tools, cementing a well so that it may be abandoned, and the like. Finally, a servicing wellbore operation may also include enhancing oil recovery operations such as injecting steam or carbon dioxide into a reservoir to increase production by reducing oil viscosity and providing miscible or partially miscible displacement of the oil.

FIG. 1 illustrates an embodiment of the components involved in a wellbore servicing operation. These components may comprise a wellbore services manifold system 110, one or more fluid supply mechanisms 112, one or more wellheads 116, and optionally one or more high-pressure pumps 114. The wellbore services manifold system 110 is configured to couple to the fluid supply mechanism 112 via supply connector 118 and flowline 120. The wellbore services manifold system 110 may be configured to couple to the high-pressure pump 114 via high-pressure pump suction connector 122 and flowline 124, as well as via high-pressure pump discharge connector 126 and flowline 128. The wellbore services manifold system 110 is configured to couple to the wellhead 116 via wellhead connector 130 and flowline 132. The wellbore services manifold system 110 may also include one or more flow distribution manifolds 134 interconnected by one or more distribution flowlines 138. In the illustrated embodiment, a plurality of connectors which could function as either a supply connector 118 or a wellhead connector 130 depending on a selected flowpath, are in fluid communication with each manifold 134.

Generally, as discussed in more detail below, a valve may be associated with each connector, flowline and/or manifold. It will be appreciated that the valves may be operated to select a flowpath for fluid passing through wellbore services manifold system 110. Thus, for example, a wellhead valve 140 is associated with wellhead connector 130, a high-pressure valve 142 is associated with each of high-pressure pump connectors 122, 126 and a supply valve 144 is associated with supply connector 118. Likewise, one or more manifold valves 146 are associated with each manifold 134. Additionally, various flowlines may have one or more valves disposed along the flowline, such as valves 148.

The wellbore services manifold system 110 may further include a skid, sled, trailer, truck, platform or other base 150 on which the various manifolds, flowlines, connectors, valves and various other components are mounted.

It is to be understood that there may be more than one components, connectors, flowlines, manifolds, valves, etc. in the wellbore servicing operations. Moreover, the connectors described herein are piping that are connected together, for example, via flanges, collars, welds, etc. These connectors may include various configurations of pipe tees, elbows, and related connectors. These connectors connect together the various wellbore servicing fluid process equipment described herein. Thus, the illustration described herein should be treated as an example and may be modified according to the need of the wellbore servicing operations by a person of ordinary skill in the art.

Fluid supply mechanism 112 may be any mechanism by which fluid is supplied to the manifold system 110, including without limitation, storage tanks, blenders, steam generators, etc. Thus, fluid supply mechanism 112 may be a fluid source or may be positioned downstream of a fluid source in order to prepare a fluid for introduction into the wellbore. To the extent fluid supply mechanism 112 is simply a fluid source, it may be one or more tanks or containers containing fluid. As used herein, "fluid" refers to any pumpable substance or mixture, including without limitation, water, chemicals, gells, slurries and the like. Fluid supply mechanism 112 may also be a fluid preparation mechanism, such as a blender for blending one or more fluids and solids, or a steam generator for generating steam for injection into a wellbore.

More particularly, in an embodiment, the fluid supply mechanism 112 mixes solid and fluid components at a desired treatment rate to achieve a well-blended mixture (e.g., fracturing fluid, cement slurry, liquefied inert gas, etc.) at a first pressure. Examples of such fluids and solids include proppants, water, chemicals, cement, cement additives, or various combinations thereof. The mixing conditions including time period, agitation method, pressure, and temperature of the supply may be chosen by one of ordinary skill in the art to produce a homogeneous blend of the desired composition, density, and viscosity or to otherwise meet the needs of the desired wellbore servicing operations. The fluid supply mechanism 112 may comprise a tank. In addition, the fluid supply mechanism 112 may include a mixer or an agitator that mixes or agitates the components of fluid within the fluid supply mechanism 112. The fluid supply mechanism 112 may also be configured with heating or cooling devices to regulate the temperature within the fluid supply mechanism 112. Alternatively, the fluid may be premixed and/or stored in a storage tank before entering the wellbore services manifold system. In some embodiments, the fluid supply mechanism 112 generally has an outlet pressure equal to or less than about 100 pounds per square inch (psi). For example, the fluid supply mechanism 112 may have a pressure from about 10 psi to about 80 psi, from about 20 psi to about 60 psi, or from about 30 psi to about 50 psi.

Alternatively, the fluid supply mechanism 112 may comprise a storage tank for an injection operation. Specifically, the fluid supply mechanism 112 may store a fluid to be injected downhole. The fluid may comprise steam or liquefied carbon dioxide, nitrogen, or any other liquefied inert gas.

Finally, fluid supply mechanism 112 may be configured to couple to the wellbore services manifold system 110 via supply connector 118 and flowline 120. There may be more than one supply connectors 118 in the wellbore services manifold system 110. For example, there may be multiple supply connectors 118. In such case, there may be more than one fluid supply mechanism 112 connected to the wellbore services manifold system 110.

While wellbore services manifold system 110 may generally be used to distributed a fluid as described herein for various pumping operations, in certain pumping operations, the fluid must be pumped under high pressure conditions. In such instances, the wellbore services manifold system 110 may be used to provide an increase in the inlet pressure for one or more high-pressure pumps 114 to organize, and/or to distribute fluids to/from other components involved in the wellbore servicing operations, such as the fluid supply mechanism 112, the high-pressure pump 118, the wellhead 122, etc. After leaving the fluid supply mechanism 112 at a first pressure via flowline 120, the fluid enters the wellbore services manifold system 110 via supply connector 118. From here, the fluid may be directed to the high-pressure pump 114 via a high pressure suction connector 122 and flowlines 124. The high-pressure pump 114 may increase the fluid's pressure to a high-pressure suitable for injection into the wellbore. The fluid may leave the high-pressure pump 114 via flowline 128, and enter the wellbore services manifold system 110 via high-pressure pump discharge connector 126. The fluid may be directed in the wellbore services manifold system via flowlines 138 and manifolds 134 before exiting the wellbore services manifold system 110 via wellhead connector 130 and flowlines 132 which are in fluid communication with wellhead 116.

Each high-pressure pump 114 may be powered by a power source 152. In an embodiment, the power source 152 may be a diesel engine coupled to the high-pressure pump 114 via a transmission 154 and drive shaft 155. An example of a suitable diesel engine includes a commercially available 520 hp Caterpillar C13.

Wellbore services manifold system 110 may include one or more boost pumps 156 for receiving flow from fluid supply mechanism 112 and increasing the pressure prior to introduction into high-pressure pump 114. The boost pump 156 is generally a positive displacement pump. An example of a suitable positive displacement pump includes a Halliburton HT-400™ Pump. In this regard, to the extent it is not necessary to operate manifold system 110 under high pressure conditions, but rather utilize manifold system 110 for a lower pressure operation, then boost pump 156 may simply be utilized without high pressure pump 114 to drive a fluid through manifold system 110.

The high-pressure pump 114 increases the pressure of the fluid. For example, the high-pressure pump 114 may have a pressure equal to or greater than about 2,000 psi, from about 5,000 psi to about 20,000 psi, or from about 8,000 psi to about 12,000 psi. An increase in the fluid's pressure may result in an increase in the fluid's velocity, which may translate to an increase in productivity. In an embodiment, the high-pressure pump or pumps 114 may produce a total fluid flow rate of equal to or greater than about 50 barrel/minute (bbl/minute), greater than about 100 bbl/minute, or greater than about 120 bbl/minute.

Figure 2:
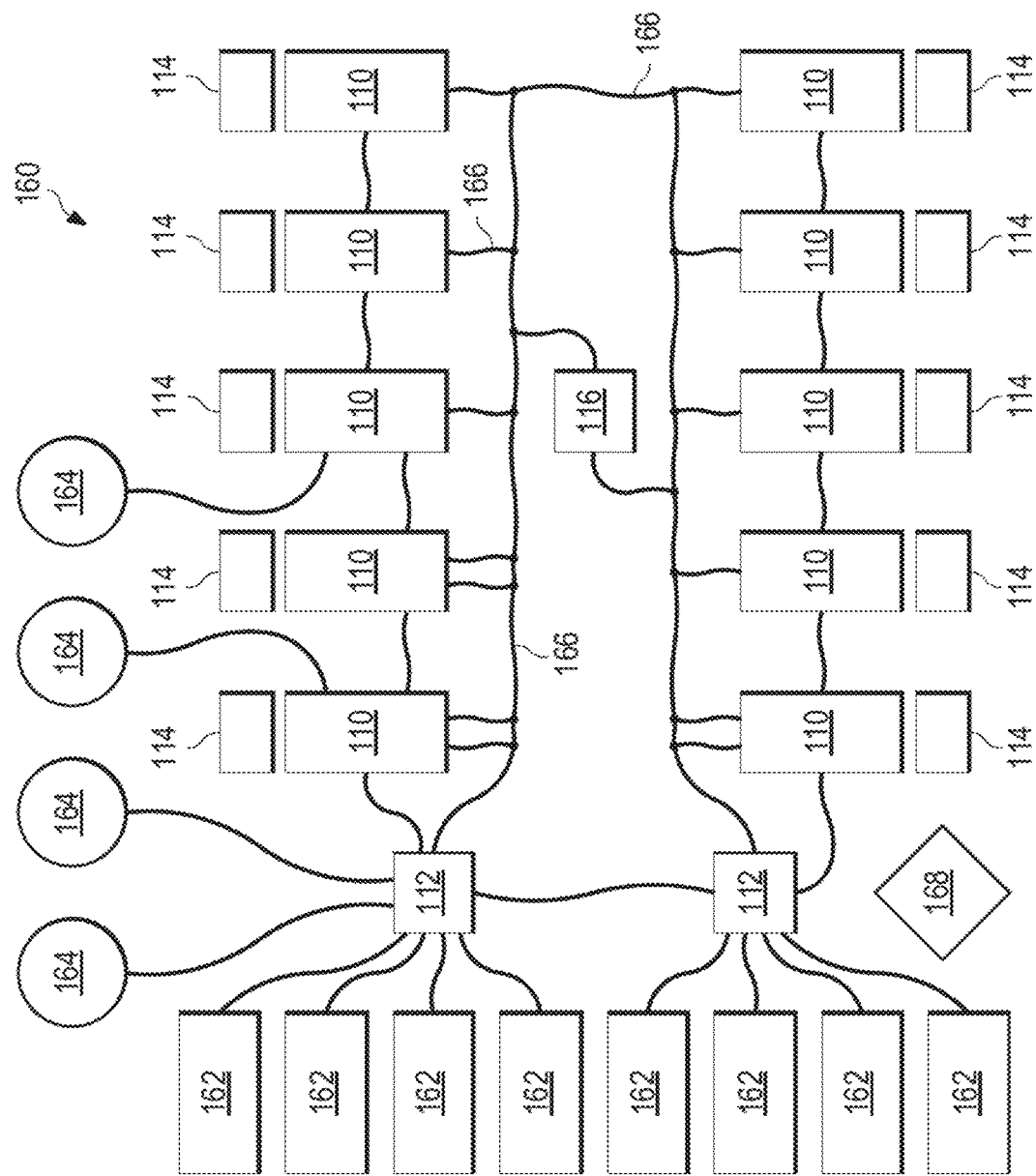
FIG. 2 is a schematic illustration of an overhead view of a wellsite employing the high-pressure pumping system of FIG. 1.

Referring to FIG. 2, wellbore services manifold system 110 is illustrated as deployed in a pumping operation, hence illustrating the large number of valves that must commonly be monitored and controlled in a wellbore operation.

Generally illustrated in FIG. 2 is a wellsite 160 having at least one wellhead 116. Each wellsite 160 may include a plurality of wellbore services manifold systems 110 in fluid communication with one or more wellheads 116, other manifold systems 110, fluid supply mechanisms 112 or other equipment, vessels or systems. The particular arrangement depicted in FIG. 2 is for illustration only and generally shows a configuration that might be utilized in high pressure pumping operations associated with hydraulic fracturing. In this regard, shown in the illustrated embodiment are a plurality of solids storage units 162, such as may contain sand or other proppants, in communication with fluid supply mechanisms 112, which may receive liquids from liquid storage tanks or vessels 164 or preparing a liquid, slurry or gel prior to pressurizing via manifold systems 110 and high pressure pumps 114. Various high pressure piping or flow lines 166 may interconnect various systems. Operations may be monitored via a control system 168, allowing an operator to control various valves and fluid flow as described in more detail below. As can be seen, a typical wellsite 160 may have a plurality of manifold systems 110, each with a plurality of associated valves. As such, an operator may need to monitor, check and actuate a multiplicity of valves in any one or more pumping operations or otherwise ensure that the multiplicity of valves are appropriately configured for a particular operation.

Figure 3:
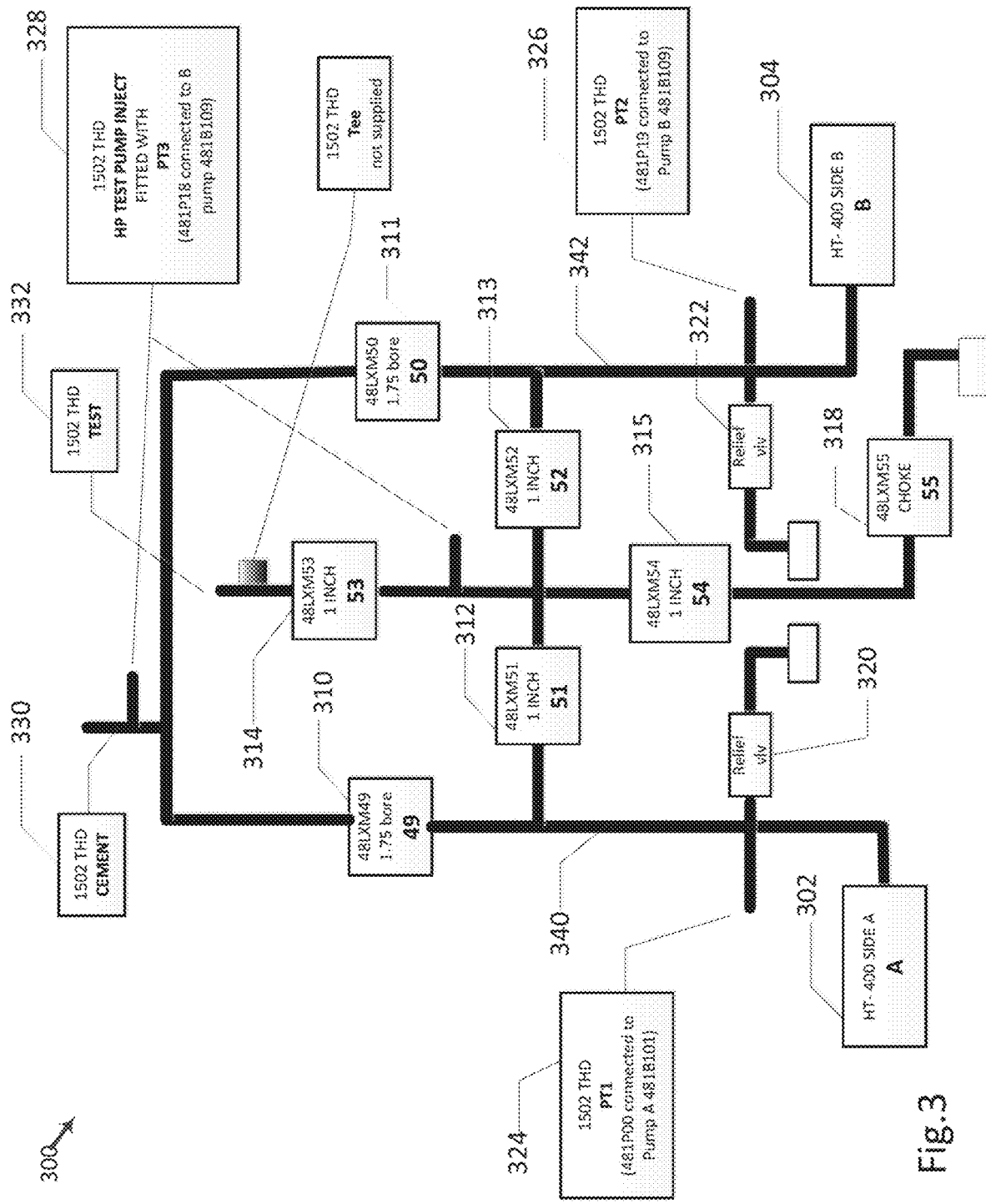
FIG. 3 is a schematic illustration showing possible flow paths depending on which valves are in an opened position and/or closed position.

FIG. 3 is a schematic illustration showing possible flow paths through a manifold system depending on which valves are in an opened position and/or closed position. While FIGS. 1 and 2 illustrate wellbore services manifold systems 110 as being mounted on a skid, the wellbore services manifold system may be any arrangement of pipes, valves and components used in a high-pressure pumping operation. To that end, in FIG. 3, a wellbore services manifold system 300 includes pumps 302 and 304, valves 310-315, and a choke 318 that interacts with the pumps and valves. In some embodiments, pumps 302 and 304 are triplex heavy-duty cement pumps. In some embodiments, pumps 302 and 304 may be high-pressure pumps such as may be utilized in hydraulic fracturing operations. Each valve 310-315 may be associated with an actuator that provides feedback for the state of that valve to control system 168. For example, if a valve is open, the actuator may send a signal indicating that this particular valve is open. If a valve is closed, the actuator may send a signal indicating that this particular valve is closed. In some embodiments, if a valve is in transition between an open state and a closed state, it being appreciated that by treating a valve in transition as though it were closed may provide for a safer state for discharge of manifold system 300. Choke 318 is designed to hold pressure when fully closed and further to survive opening under pressure, more so than the rest of the valves.

An operator may use discharge wellbore services manifold system 300 to direct fluid from pumps 302 and 304 into two different output lines, namely lines 340 and 342. Accordingly, the operator has an opportunity to close one pump and open the other pump or close both pumps, by implementing certain valve configurations. While wellbore services manifold system 300 may include one or more relief valves 320 and 322 and pressure transducers 324, 326 to provide pressure measurement points for particular locations in discharge manifold 300, it will be appreciated that it is desirable to avoid a pressure situation where a relief valve might be utilized or a pressure transducer would experience a deadhead pressure. In one or more embodiments, a test pump 328 may be interconnected with manifold system 300. Test pump 328 may be provided with a pressure transducer and relief valve as well. In some examples, test pump 328 is a high-pressure test pump that provides higher pressure for testing of discharge manifold system 300 itself or may be utilized to test flowlines, such as flowlines 166 of FIG. 2, and generate pressure for testing connections between manifold system 300 and a wellhead.

In the particular manifold system 300 illustrated, the sources of pressure are pumps 302 and 304 while discharge points 330 and 332 discharge a pressurized fluid. Discharge point 330 discharges to a flowline, such as a cement line, in direct or indirect fluid communication with a wellhead, and test discharge point 332 discharges to a test line (not shown). The valves in between the pump(s) and discharge(s) may be monitored and controlled as disclosed herein to ensure that the operator does not pump fluid into discharge manifold 300 for particular valve configurations that could result in an undesired pressure condition.

Wellbore services manifold system 300 may be a high-pressure manifold system, and an operator may be in control of the valves that operate on the high-pressure manifold. These high pressure valves are arranged in wellbore services manifold system 300 to control the flow from one or both pumps to one or both outlets. Any given wellbore services operation may include one or more wellbore services manifold systems configured for the particular pumping operation, and as such may have numerous valve configurations during any given job. For example, the operator may adjust valves from an opened position to a closed position or vice-versa to obtain a particular valve configuration. Valves in the system may be high-pressure valves, and the operator may be required to quickly adjust valves during a particular operation.

Because of the large number of valves and the speed with which valves may need to be adjusted, opportunities exist in which the operator may place the valves in a state that would inadvertently result in an over-pressuring of the manifold system. For example, the operator may inadvertently actuate the wrong valve to an opened or closed position, which unknowingly places the manifold system in an overpressured state, following which the operator starts pumping. For high-pressure pumping operations as described herein, a high-pressure pump may reach 20,000 PSI in a matter of seconds in order to pump a large volume of fluid into a wellbore. In this situation, the operator may have no time to evaluate the valve configuration and attempt to fix the overpressure state before damage to the wellbore services manifold system could occur.

Conventional techniques to protect the wellbore services manifold system include an overpressure kick-out system guided by pressure transducers and/or high-pressure mechanical relief valves as described above. In some cases, neither of these protective systems could be relied upon to respond in time to prevent an overpressure situation.

The present disclosure provides systems and techniques to warn an operator when a proposed valve configuration of wellbore services manifold system, such as manifold system 110 or 300, would place the manifold system in an undesirable or high-pressure state. As used herein, a "valve configuration" refers to the actual or proposed overall setting of all of the valves of a wellbore services manifold system, whereas "valve state" refers to the actual or proposed open, closed or transitioning position of a particular valve. Thus, valve state may refer to a valve position resulting from applying a request to open or close a valve in a current valve configuration, regardless of whether the request is actually performed. Additionally, in some embodiments where the operator is testing a particular valve or valve configuration, the system and methods as disclosed allow an operator to accept acknowledgement of the potentially overpressure configuration in order to continue with the testing.

In embodiments of the disclosure, control system 168 (FIG. 2) stores a list of valve configurations for a particular operation and/or a list of valve configurations that could create an overpressure condition for the wellbore services manifold system. An overpressure condition may be a valve arrangement in which no fluid flow path to an outlet is available when a pump is operating, leading to a corrective action where either the pump can no longer pump due to horsepower limitations or the pressure relief valve opens when a predetermined pressure is reached, thereby relieving the pressure or the power transmission driving the pump is electronically commanded to switch to neutral when a set pressure is reached. However, it would be more desirable to utilize the valve configuration for a particular operation and/or a list of valve configurations that could create an overpressure condition and/or a list of current valve states in order to avoid an overpressure condition that would lead to one of the corrective actions.

FIG. 4 is an example table 400 of overpressured states for valves in discharge wellbore services manifold system 300. In FIG. 4, an "X" represents a valve that is closed, and an "0" represents a value that is opened. Table 400 shows different valve configurations that have been identified as potentially resulting in overpressured states. As illustrated on the first line of table 400, if pump 302 is operating, i.e. the rotation of the drive shaft operating pump 302 is not equal to zero, and if valves 310 and 312 are closed and valves 311, 313-315, and 318 are open, this valve configuration is identified as an overpressured state. Additionally, if pump 302 is operating and if both valves 310 and 313-315 are closed and valves 311, 312, and 318 are open, this valve configuration is also identified as an overpressured state. Thus, in one or more embodiments, a plurality of valve configurations that would result in an overpressured state of a wellbore services manifold system when pumps are operating are identified and recorded. For example, an administrator or computer system may identify the overpressured states and enter them into table 400.

In some embodiments, control system 168 monitors the valve configurations of a wellbore services manifold system for overpressured states. In this regard control system 168 may monitor the state of each valve and compare the valve states to configurations that have been identified as overpressured. Before a pump is operated to deliver a pressurized fluid to the wellbore services manifold system, the operator configures the high-pressure manifold to create an "open" fluid flow path through the wellbore services manifold system, such as between the pump and the wellhead or the pit. The present disclosure provides techniques to assist the operator in configuring the valves to ensure that they are not inadvertently placed in an overpressured configuration.

In some embodiments, the safety check processes may be two-fold: (i) preventing manipulation of a valve during an on-going pumping operation when such valve manipulation would lead to an overpressured configuration and (ii) preventing pumping into wellbore services manifold system when the valves are in an overpressured configuration. Manipulation of a valve may include opening a valve, closing a valve, or taking a valve offline or out of service. An operator may send a request via control system 168 to manipulate a valve. If control system 168 receives a request to manipulate a valve, control system 168 may send a command to the valve's corresponding actuator to perform the manipulation.

The foregoing may be implemented by a control system, such as control system 168, where various valve configurations for a wellbore services manifold system to be used in a particular operation have been inputted. Likewise, the system may include valve states associated with a particular configuration that could result in an overpressured wellbore services manifold system. First, the wellbore services manifold system is protected in the circumstance where an attempt is made to manipulate, i.e., open or close, a valve while the pump transmission (such as transmission 154 of FIG. 1) is engaged, or otherwise where drive shaft revolutions per minute (rpm) (such as drive shaft 155 of FIG. 1) is above zero (see FIG. 1). Second, the transmission (such as transmission 154 of FIG. 1) between a pump and the power source is prevented from being engaged, or otherwise the drive shaft (such as drive shaft 155 of FIG. 1) is prevented from rotation, i.e., of having a rotation of above zero rpm, when the current valve configuration does not have an open flow path (see FIG. 8) or would otherwise result in an overpressure of the wellbore services manifold system.

In one or more embodiments, an operator may provide a control system 168 with a proposed valve configuration for a wellbore services manifold system to be implemented in a proposed pumping operation. Control system 168 does not automatically open or close any of the valves in wellbore services manifold system 300 but rather implements the safety check process described herein, it being understood that prior to a pumping operation, the operator may still set each valve as desired for the operation. As an operator attempts to operate a pump using the particular valve configuration set by the operator, control system 168 prevents the pumps from being operated to pump fluid if the valve configuration would result in an overpressured state. Additionally, once a pumping operation has begun, control system 168 may prevent the operator from manipulating a valve in the valve configuration. The safety checks may apply to valve closure/opening on the valve control screen, gear selection in a transmission, and speed control on electric motor drivers. In order to achieve this safety protection, control system 168 may determine the true states (e.g., opened or closed) of the valves as well as the state of the transmission (engaged or disengaged), and/or the rotation of the pump drive shaft (rpm).

The operator may interact with the manifold system using control system 168. As used herein, a "control system" may refer to an information processing system that is representative of one of, or a portion of, the information processing systems described in the present disclosure. The information processing system may include any or all of the following: (a) a processor for executing and otherwise processing instructions, (b) a plurality of input devices, which are operably coupled to the processor, for inputting information, (c) an optional display device, which is operably coupled to the processor, for displaying information, (d) an optional print device, which is operably coupled to the processor, for printing visual images and/or scanning visual images, (e) a computer-readable medium that is operably coupled to the processor, for storing information, as discussed further below, and (f) various other electronic circuitry for performing other operations of the information processing system known in the art. For example, the information processing system may include (a) a network interface (e.g., circuitry) for communicating between the processor and the network and/or other devices, and (b) a memory device (e.g., FLASH memory, a random access memory (RAM) device or a read-only memory (ROM) device for storing information (e.g., instructions executed by the processor and data operated upon by the processor in response to such instructions)).

Figure 5:
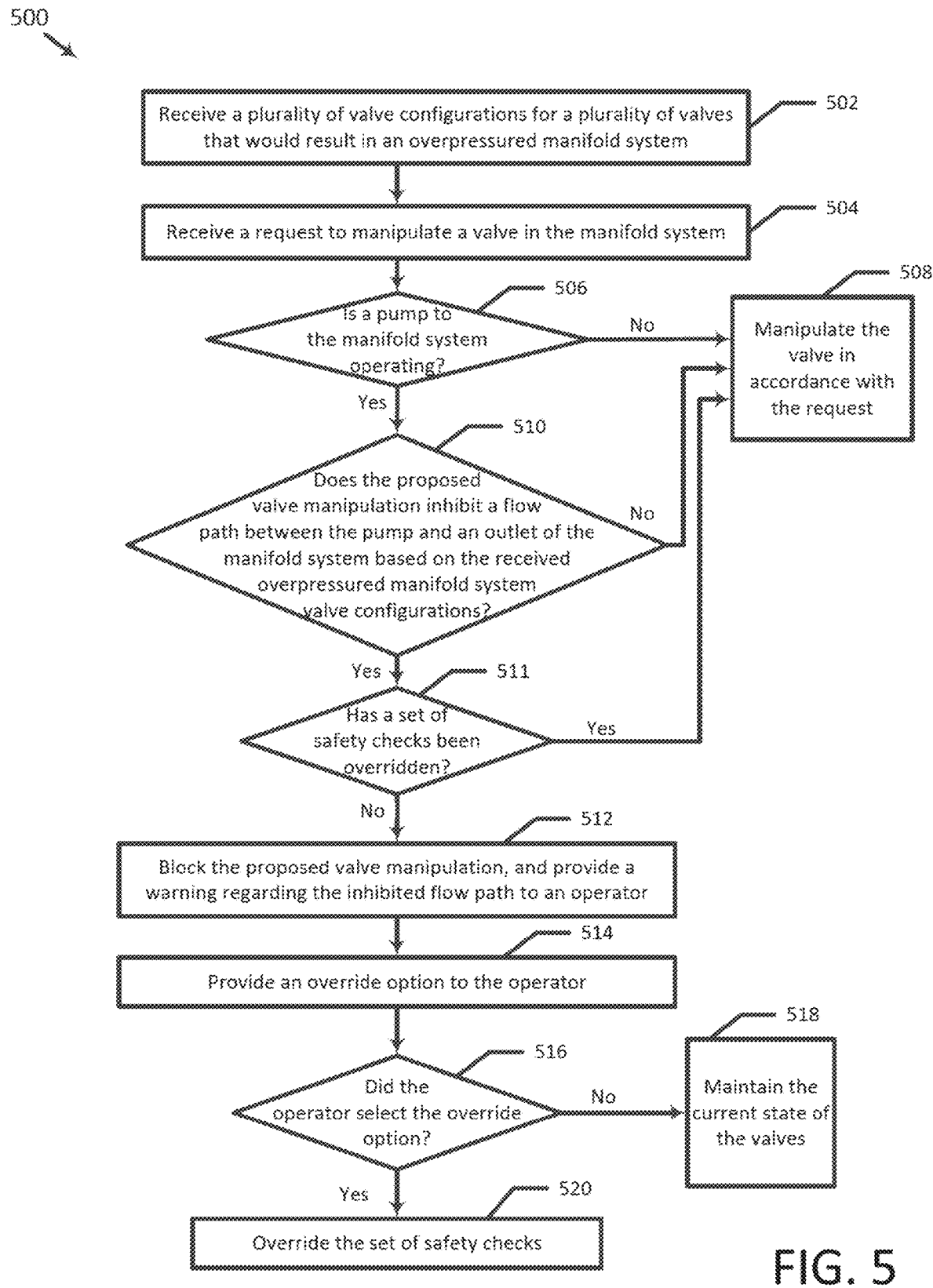
FIG. 5 is an example flowchart of an example valve safety configuration method.

Turning to FIG. 5, steps in an example valve safety configuration method 500 are illustrated. Method 500 may help prevent an operator from manipulating valves in a way that would cause an overpressured state to occur in a wellbore services manifold system, while still allowing the operator to override the safety checks as desired. In some examples, control system 168 implements method 500 in response to an operator sending a request to manipulate a valve (e.g., closing or opening the valve) in wellbore services manifold system 300. Method 500 is not meant to be limiting and may be used in other applications. Control system 168 may be utilized to implement a control sequence in order to determine whether a proposed valve configuration would result in an overpressured state.

In a step 502, a plurality of valve configurations for a plurality of valves that would result in an overpressured manifold system is received. In some examples, control system 168 receives valve configurations listed in table 400 that would result in an overpressured manifold system.

In a step 504, a request to manipulate a valve in the manifold system is received. In some examples, an operator sends a request to manipulate a valve in manifold system 300 via a control panel at control system 168, and control system 168 receives the request to manipulate the valve in the manifold system. The request may be to close or open the valve. In a step 506, it is determined whether a pump to the manifold system is operating. In some examples, control system 168 determines whether a pump to the manifold system is operating. In some embodiments, if the drive shaft rpm is greater than zero or the clutch is engaged, the pump to the manifold system is operating.

In response to a determination that the pump to the manifold system is not operating, then process flow may proceed to a step 508, in which the valve is manipulated in accordance with the request. In some examples, in response to a determination that the pump to the manifold system is not operating, then process flow may proceed to method 800 (e.g., at least some of steps 804-816 in FIG. 8). In response to a determination that the pump to the manifold system is operating, then process flow proceeds to a step 510, in which it is determined whether the proposed valve manipulation would inhibit a flow path between the pump and an outlet of the manifold system based on the received overpressured manifold system valve configurations. In some examples, control system 168 determines whether the proposed valve manipulation would inhibit a flow path between the pump and an outlet of the manifold system based on the received overpressured manifold system valve configurations. The proposed valve manipulation inhibits a flow path between the pump and an outlet of the manifold system if there is a complete blockage of the flow path, or just enough closed valves to cause an undesired increase in pressure in the flow path. An undesired increase in pressure in the flow path may occur if the pressure in the flow path exceeds a pressure threshold. An outlet may refer to any outlet from the manifold system, which could be for example to a wellbore, a test system or to other wellsite equipment.

The current state of each valve may be the current valve configuration. In some examples, control system 168 determines whether the proposed valve manipulation inhibits a flow path between the pump and an outlet of the manifold system by determining a current state of each valve of the plurality of valves, comparing the current valve configuration to the known overpressure configurations (e.g., configurations in table 400), and determining if manipulation of the valve would result in an overpressure configuration. Each valve may be associated with an actuator that provides feedback for the state of that valve to control system 168. For example, if a valve is in the open state, the actuator for that valve may send a signal indicating that this particular valve is in the open state. If a valve is in the closed state, the actuator for that valve may send a signal indicating that this particular valve is in the closed state. If a valve is in transition between the opened and closed states, it being appreciated that by treating a valve in transition as though it were closed may provide for a safer state for discharge of manifold system 300. The actuator may send these signals indicating the state of a valve to control system 168.

Control system 168 may periodically determine the open or closed state of each of the valves in wellbore services manifold system 300 resulting in a current valve arrangement. The actuators chosen for valve control may have internal intelligence that can communicate the valve state via industry standard field bus. For example, Profibus DP, Profibus PA, Profinet, etc. may be used. The valve state information may be sent via bus to the controller in real-time to allow the controller to process the data and make decisions based upon the states of the valves.

In response to a determination that the proposed valve manipulation would not inhibit the flow path and would not result in an overpressured manifold system, then process flow proceeds to step 508, in which the valve is manipulated in accordance with the request. For example, control system 168 sends a signal to the actuator associated with the valve to close the valve if the request to manipulate the valve was a request to close the valve, or to open the valve if the request to manipulate the valve was a request to open the valve.

In contrast, in response to a determination that the proposed valve manipulation would inhibit the flow path and would result in an overpressured manifold system, then process flow proceeds from step 510 to a step 511, in which it is determined whether a set of safety checks has been overridden. If the operator selects the override option, the operator has opted to override a set of safety features related to the inhibited flow path between the pump and outlet of the manifold system. In response to a determination that the set of safety checks has been overridden, process flow proceeds to step 508, in which the valve is manipulated in accordance with the request. In contrast, in response to a determination that the set of safety checks has not been overridden, process flow proceeds from step 511 to a step 512, in which the proposed valve manipulation is blocked, and a warning regarding the inhibited flow path is provided to an operator. The warning may warn the operator that manipulating the valve in accordance with the request will place manifold system 300 in an overpressured state. By providing the warning to the operator, control system 168 may warn and prevent the operator from manipulating a valve during an on-going pumping operation when such valve manipulation would lead to an overpressured configuration.

In a step 514, an override option is provided to the operator. In some examples, the override option allows the operator to override the set of safety check features, and control system 168 provides the override option to the operator. In a step 516, it is determined whether the operator selected the override option. In response to a determination that the operator did not select the override option, then process flow proceeds to a step 518, in which the current state of the valves is maintained. For example, the request to manipulate the valve may be discarded. In response to a determination that the operator has selected the override option, then process flow proceeds to a step 520, in which the set of safety checks is overridden. At a later point in time, another request to manipulate a valve in the manifold system may be received at step 504. Process flow may proceed from step 504 to step 511, in which it is determined whether the set of safety checks has been overridden. If the operator has already selected to override the set of safety checks, then process flow may proceed from step 511 to step 508, in which the valve is manipulated in accordance with the request, even though manipulation of the valve in accordance with the request places manifold system 300 in an overpressured state.

In some examples, the operator may override the safety check features and complete an operation that is identified as placing wellbore services manifold system 300 in an overpressured state. There may be situations in which it may be desirable to perform the operation even though it places wellbore services manifold system 300 in an overpressured state. For example, control system 168 may allow an overpressured state to exist because of business needs, such as pressure testing. The operator may perform such an action to pressure test wellbore services manifold system 300 and to ensure that it will hold the anticipated pressure during an actual job. Control system 168 may provide a warning to the operator and require the operator to accept the responsibility of the action(s) that place wellbore services manifold system 300 in an overpressured state.

It is understood that additional processes may be inserted before, during, or after steps 502-520 discussed above. It is also understood that one or more of the steps of method 500 described herein may be omitted, combined, or performed in a different sequence as desired. For example, in another implementation, step 511 may be omitted and process flow may proceed from step 510 to step 512. In this example, if the operator selects the override operation, process flow may proceed from step 516 to step 508.

By providing warnings or alerts to the operator, critical operator interface buttons may be provided to the operator, with an instant assessment as to whether to allow a command or operation to continue. If the proposed valve configuration places wellbore services manifold system 300 in an overpressured state, the operator is provided a warning at that time and the operation is blocked until the operator consciously makes a decision to select the override button to place wellbore services manifold system 300 into an overpressured state. Control system 168 may allow an overpressured state to exist because of business needs, such as pressure testing. The operator may perform such an action to pressure test wellbore services manifold system 300 and to ensure that it will hold the anticipated pressure during an actual job.

Figure 6:
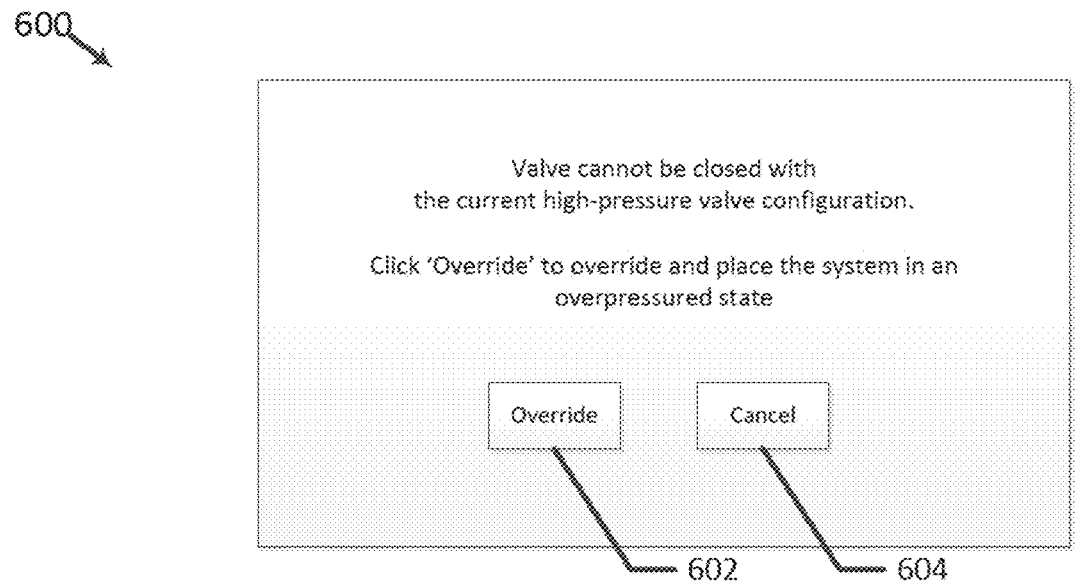
FIG. 6 is an example message indicating that the proposed valve configuration places the system in an overpressured state.

FIG. 6 is an example message 600 indicating that the proposed valve configuration places the system in an overpressured state. Message 600 may be displayed to an operator in step 512 and/or 514 of method 500. In some examples, message 600 appears in a popup window on a display in response to the operator requesting a valve to be manipulated (e.g., a valve-close operation) and manipulating the valve in accordance with the request would result in an overpressured state. In FIG. 6, message 600 displays, "Valve cannot be closed with the current high-pressure valve configuration. Click 'Override' to override and place the system in an overpressured state." Two user selectable options "Override" 602 and "Cancel" 604 are provided to the operator for selection. In some examples, the operator is forced to make a decision between these two user selectable options, and one of these two options must be selected before message 600 disappears.

If the operator selects user selectable option "Cancel" 604, control system 168 detects an input selection of user selectable option "Cancel" 604. In response to detecting the input selection of user selectable option "Cancel" 604, control system 168 may cancel the proposed valve configuration, remove message 600, and leave the valve configuration as-is. Accordingly, control system 168 blocks the proposed valve manipulation and does not take action to manipulate the valve in accordance with the request.

If the operator selects user selectable option "Override" 602, control system 168 detects an input selection of user selectable option "Override" 602. In response to detecting the input selection of user selectable option "Override" 602, control system 168 may manipulate the valve in accordance with the request, even though doing so places wellbore services manifold system 300 in an overpressured state. If the operator selects user selectable option "Override" 602, control system 168 may remove message 600 from the display and display a banner to warn the operator that wellbore services manifold system 300 is in an overpressured state. Wellbore services manifold system 300 may continue to operate in the overpressured state until the operator chooses to cancel the overpressured state. The control system 168 may cancel the overpressured state if the operator sends a request to cancel the overpressured state and the current valve configuration of wellbore services manifold system 300 does not match any of the identified overpressured states (e.g., in table 400).

In some embodiments, if the operator attempts to perform an action that would place the valve configuration in a particular overpressured state, control system 168 may prevent the operator from being able to perform that action even if the operator selects user selectable option "Override" 602.

Figure 7:
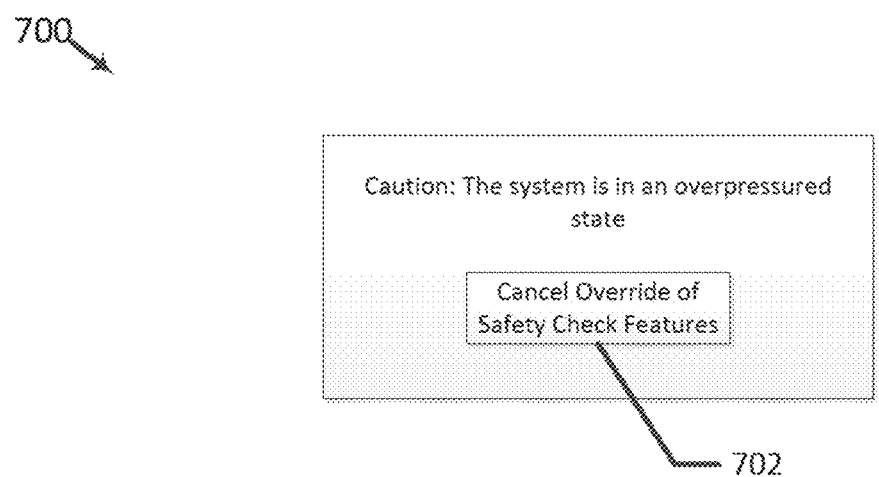
FIG. 7 is an example message indicating that the safety checks have been disabled.

FIG. 7 is an example message 700 indicating that the wellbore services manifold system 300 is in an overpressured state. Message 700 may be displayed if control system 168 has determined that the operator has selected the override option (e.g., see steps 514 and 516 of method 500). In some examples, message 700 is displayed in a popup window that appears on a display when the operator selects the override option and places wellbore services manifold system 300 in an overpressured state. Message 700 may appear on a display to provide the operator with a visual indication that the wellbore services manifold system 300 is in an overpressured state. Message 700 warns the operator with the following message, "Caution: The system is in an overpressured state." User selectable option "Cancel Override of Safety Check Features" 702 is provided to the operator for selection. Message 700 may remain on the display until the operator selects user selectable option "Cancel Override of Safety Check Features" 702 and wellbore services manifold system 300 is not in an overpressured state. If the operator selects user selectable option "Cancel Override of Safety Check Features" 702, control system 168 detects an input selection of user selectable option "Cancel Overpressured Override of Safety Check Features" 702. In response to detecting the input selection of user selectable option "Cancel Override of Safety Check Features" 702, control system 168 may determine whether the current valve configuration of wellbore services manifold system 300 is in an overpressured state.

If wellbore services manifold system 300 is not in an overpressured state, control system 168 may undo the operator's selection of the override option and enable the set of safety check features that were previously overridden.

Accordingly, the next time the operator sends a request to manipulate a valve and manipulation of the valve in accordance with the request would place wellbore services manifold system 300 in an overpressured state, at least some of steps 506-520 of method 500 may be performed. In contrast, if wellbore services manifold system 300 is in an overpressured state when the operator selects user selectable option "Cancel Override of Safety Check Features" 702, control system 168 may warn the operator that wellbore services manifold system 300 is currently in an overpressured state. Control system 168 may offer the operator the option to select a valve configuration to implement in wellbore services manifold system 300 such that it is no longer in an overpressured state (e.g., open all valves or particular valves in accordance with a particular job operation). If the operator sends a request to implement one of these particular valve configurations, then control system 168 may actuate the appropriate valves in order to invoke that particular valve configuration in the manifold system. The operator may be provided with user selectable option "Cancel Override of Safety Check Features" 702 again.

Figure 8:
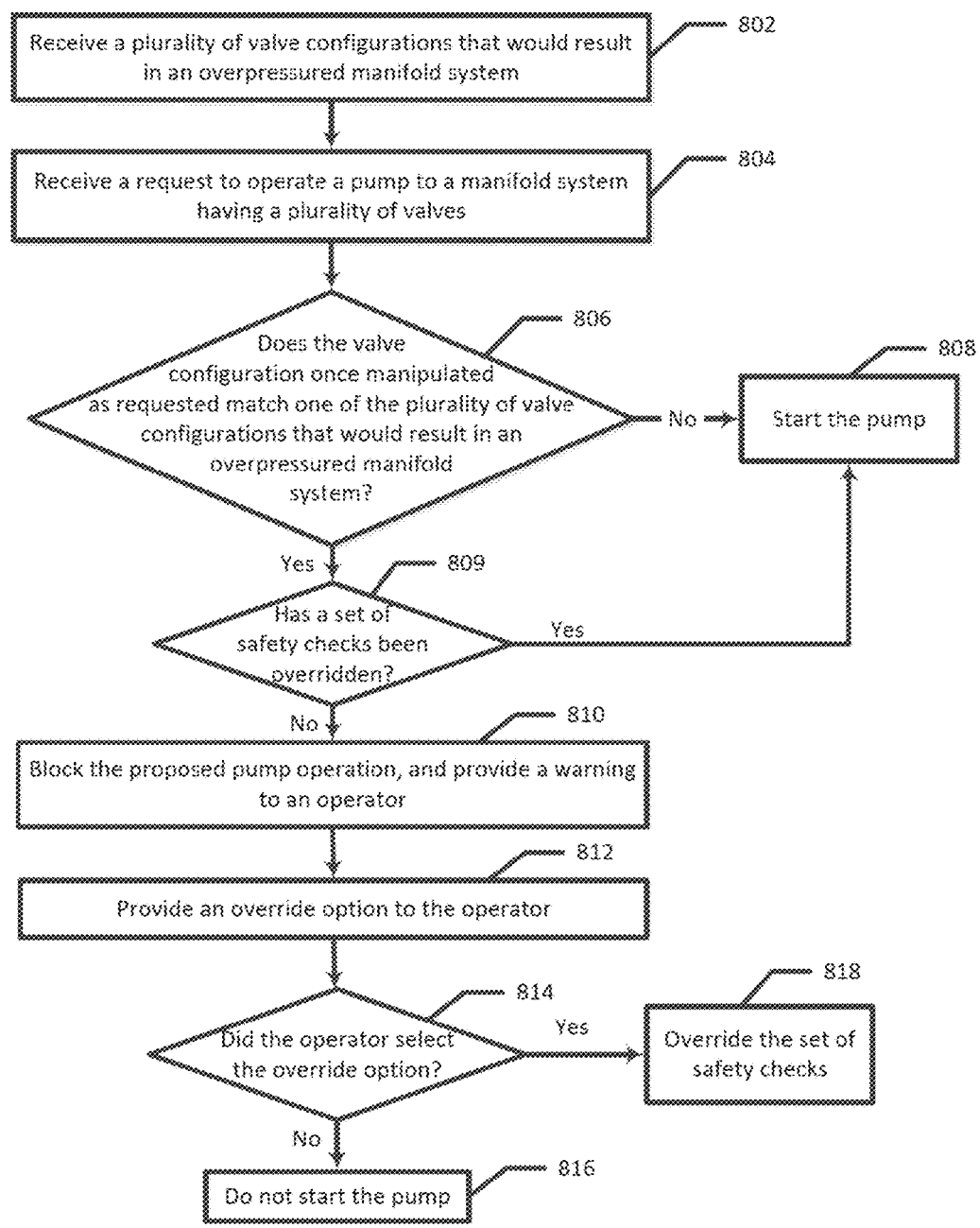
FIG. 8 is an example flowchart of a method of an example pump safety configuration method.

Turning to FIG. 8, steps in an example pump safety configuration method 800 are illustrated. In some examples, control system 168 implements method 800 for prevention of pumping into wellbore services manifold system 300 when the valves are in an overpressured configuration. Method 800 may help prevent an operator from accidentally starting a pump (e.g., by increasing the rpm or engaging the clutch) when the valves are arranged in an overpressured state, while still allowing the operator to override a set of safety check features and place the system in an overpressured state if the job requires it. Method 800 is not meant to be limiting and may be used in other applications. Control station 168 is utilized to implement a control sequence in order to prevent initiation of pumping into wellbore services manifold system 300 when its current valve configuration is in an overpressured state.

In a step 802, a plurality of valve configurations that would result in an overpressured manifold system is received. In a step 804, a request to operate a pump to a manifold system is received, the manifold system having a plurality of pumps. An operator may be at control system 168 and send a request to start a pump for pumping into wellbore services manifold system 300. At a step 806, it is determined whether the valve configuration once manipulated as requested matches one of the plurality of valve configurations that would result in an overpressured manifold system. In some examples, control system 168 determines whether the valve configuration once manipulated as requested matches one of the plurality of valve configurations that would result in an overpressured manifold system by determining the current state of each valve of the plurality of valves and comparing the current valve configuration to the known overpressure valve configurations. If the valve configuration once manipulated as requested does not match any one of the plurality of valve configurations that would result in an overpressured manifold system, then an acceptable flow path exists between the pump and an outlet in the manifold system. In particular, a flow path exists that would not result in an overpressured manifold system. In contrast, if the valve configuration once manipulated as requested matches one of the plurality of valve configurations that would result in an overpressured manifold system, then an acceptable flow path does not exist between the pump and an outlet in the manifold system. In particular, a flow path exists that would result in an overpressured manifold system.

In response to a determination that a flow path exists that would not result in an overpressured manifold system, then process flow proceeds to a step 808, in which the pump is started. Control system 168 may provide a signal to the pump to turn on and/or to start pumping liquid. In some examples, the drive shaft rpm (such as drive shaft 155 of FIG. 1) is increased above zero or the transmission (such as transmission 154 of FIG. 1) between the pump and the power source is engaged. In contrast, in response to a determination that a flow path exists that would result in an overpressured manifold system, then process flow proceeds from step 806 to a step 809, in which it is determined whether a set of safety checks has been overridden. If the operator selects the override option, the operator has opted to override a set of safety features related to the flow path that would result in an overpressured manifold system. In response to a determination that the set of safety checks has been overridden, process flow proceeds to step 808, in which the pump is started. In contrast, in response to a determination that the set of safety checks has not been overridden, process flow proceeds from step 809 to a step 810, in which the proposed pump operation is blocked, and a warning is provided to an operator. The warning may warn the operator that no acceptable flow path exists between the pump and an outlet in the manifold system. By providing the warning to the operator, control system 168 may warn and prevent the operator from starting and running a pump when the current valves are in an overpressured configuration.

In a step 812, an override option is provided to the operator. In some examples, the override option allows the operator to override the set of safety check features, and control system 168 provides the override option to the operator. In a step 814, it is determined whether the operator selected the override option. In response to a determination that the operator has selected the override option, process flow proceeds to a step 818, in which the set of safety checks is overridden. At a later point in time, another request to operate a pump to the manifold system may be received at step 804. Process flow may proceed from step 804 to step 809, in which it is determined whether the set of safety checks has been overridden. If the operator has already selected to override the set of safety checks, then process flow may proceed from step 809 to step 808, in which the pump is started, even though the valves are in an overpressured configuration. If the operator selects the override option, the operator has opted to override a set of safety features related to the flow path between the pump and outlet of the manifold system. In contrast, in response to a determination that the operator has not selected the override option, then process flow proceeds to a step 816, in which the pump is not started. For example, the pump is maintained in its current state.

Accordingly, the operator may override safety check features and complete an operation that pumps liquid into wellbore services manifold system 300, even though wellbore services manifold system 300 is in an overpressured state or the valves are in an overpressured configuration. There may be situations in which it may be desirable to allow the operator to turn on and start the pump even though the wellbore services manifold system 300 does not have an open fluid flow path. For example, the operator may perform such an action to pressure test wellbore services manifold system 300 and to ensure that it will hold the anticipated pressure during an actual job. Control system 168 may provide a warning to the operator and require the operator to accept the responsibility of the action(s) that pump liquid into wellbore services manifold system 300 if the valves are in an overpressured configuration.

It is understood that additional processes may be inserted before, during, or after steps 802-816 discussed above. It is also understood that one or more of the steps of method 800 described herein may be omitted, combined, or performed in a different sequence as desired. Methods 500 and 800 may run periodically, continuously, and/or simultaneously. For example, in another implementation, step 809 may be omitted and process flow may proceed from step 806 to step 810. In this example, if the operator selects the override operation, process flow may proceed from step 814 to step 808.

Figure 9:
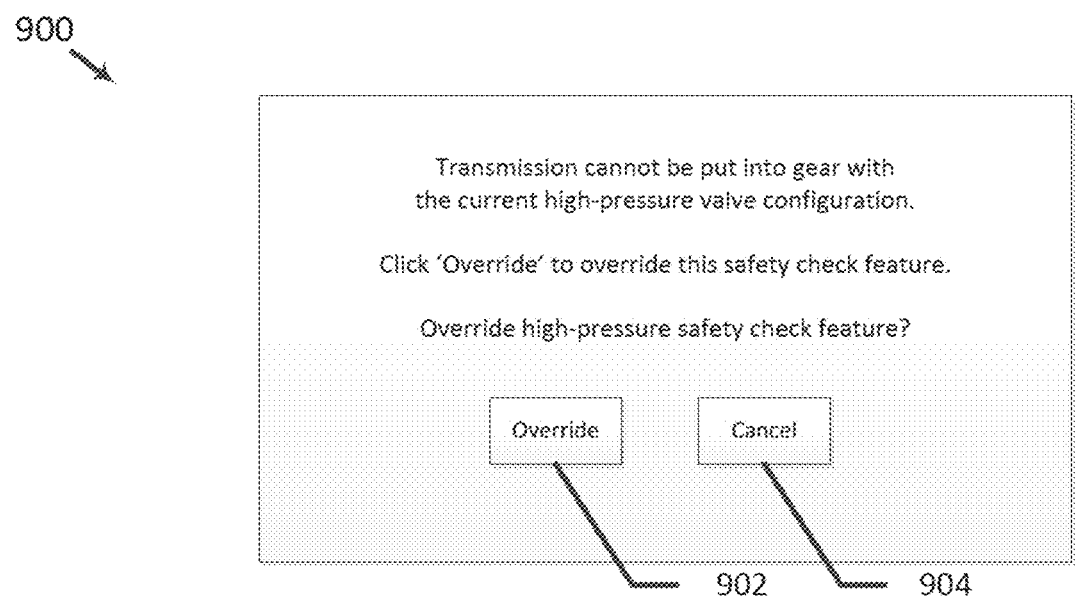
FIG. 9 is an example message indicating that running the pump in the current valve configuration would place the system in an overpressured state.

FIG. 9 is an example message 900 indicating that the valves are in an overpressured valve configuration and the pump cannot be started with the current high-pressure valve configuration. Message 900 may be displayed on a display in step 810 and/or 812 of method 800. In some examples, message 900 appears in a popup window on a display of control system 168 when wellbore services manifold system 300 is in an overpressured state and the operator has requested to run a pump to the manifold system. In FIG. 9, message 900 displays, "Transmission cannot be put into gear with the current high-pressure valve configuration. Click 'Override' to override this safety check feature. Override high-pressure safety check feature?" Two user selectable options "Override" 902 and "Cancel" 904 are provided to the operator for selection. If the operator selects user selectable option "Override" 902, the operator selects to override the safety check feature and the pump may be run. If the operator selects user selectable option "Cancel" 904, the operator selects to cancel the request to pump and control system 168 may accordingly discard the request.

Additionally, it may be desirable to provide other ways to check the valve configurations before pumping. Some manifolds may include a large number of electronically-controlled valves. The quality of the service provided depends on the proper functioning of these valves. Conventional techniques provide for manual checking of valves, valve-by-valve with no automation or timing of the operations. This is a very tedious and manual task and operators may miss some valves or not check them at all. Additionally, if checking the valve configurations is not part of a pre-job routine, the valves may not be checked at all prior to starting the job.

The present disclosure provides techniques to allow the operator to run an automated test of the valves to verify that they are working satisfactorily before beginning the service operation. By providing this automated quality process, the operator may be more confident in knowing that the valves are operating as they should. The present disclosure encourages the operator to perform a function check of all (or at least some of) the valves by providing the operator with an easy-to-use, automated process that may contribute to higher-quality services.

Figure 10:
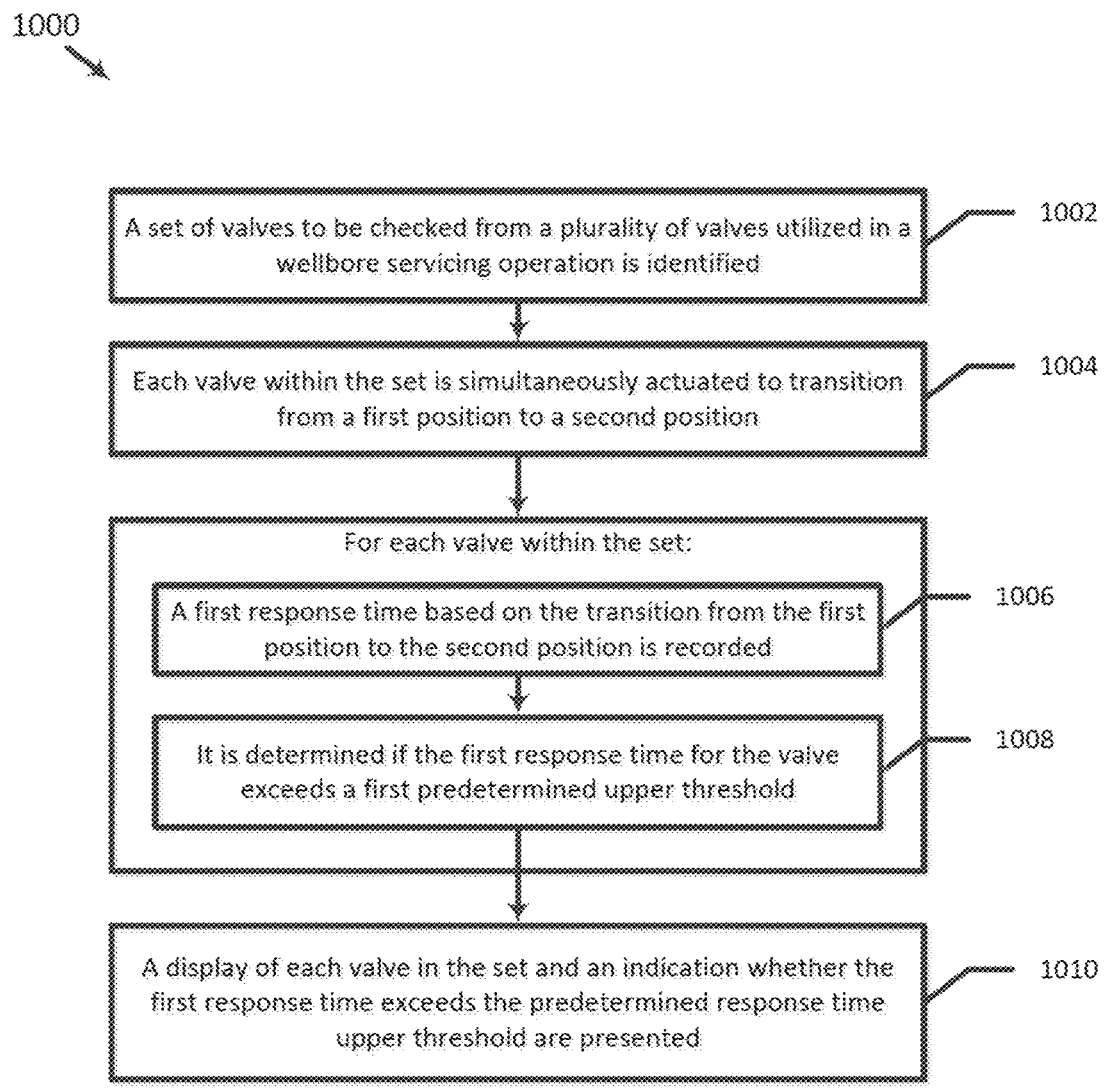
FIG. 10 is an example flowchart of a method of performing a valve check on a plurality of valves utilized in a wellbore servicing operation.

Turning to FIG. 10, steps in an example valve check method 1000 are illustrated. Method 1000 may help in identifying valves that are not working properly in wellbore services manifold system 300. In some examples, method 1000 is used to perform a valve check on a plurality of valves utilized in a wellbore servicing operation. Method 1000 is not meant to be limiting and may be used in other applications. Control station 168 is utilized to implement a control sequence in order to determine whether one or more valves in wellbore services manifold system 300 are operating properly (e.g., closing and opening properly).

In a step 1002, a set of valves to be checked from a plurality of valves utilized in a wellbore servicing operation is identified. In an example, control system 168 provides a user selectable option "Check responses of valves" on a display to the operator. If the operator selects the user selectable option "Check responses of valves," control system 168 detects an input selection of the user selectable option "Check responses of valves."

Figure 11:
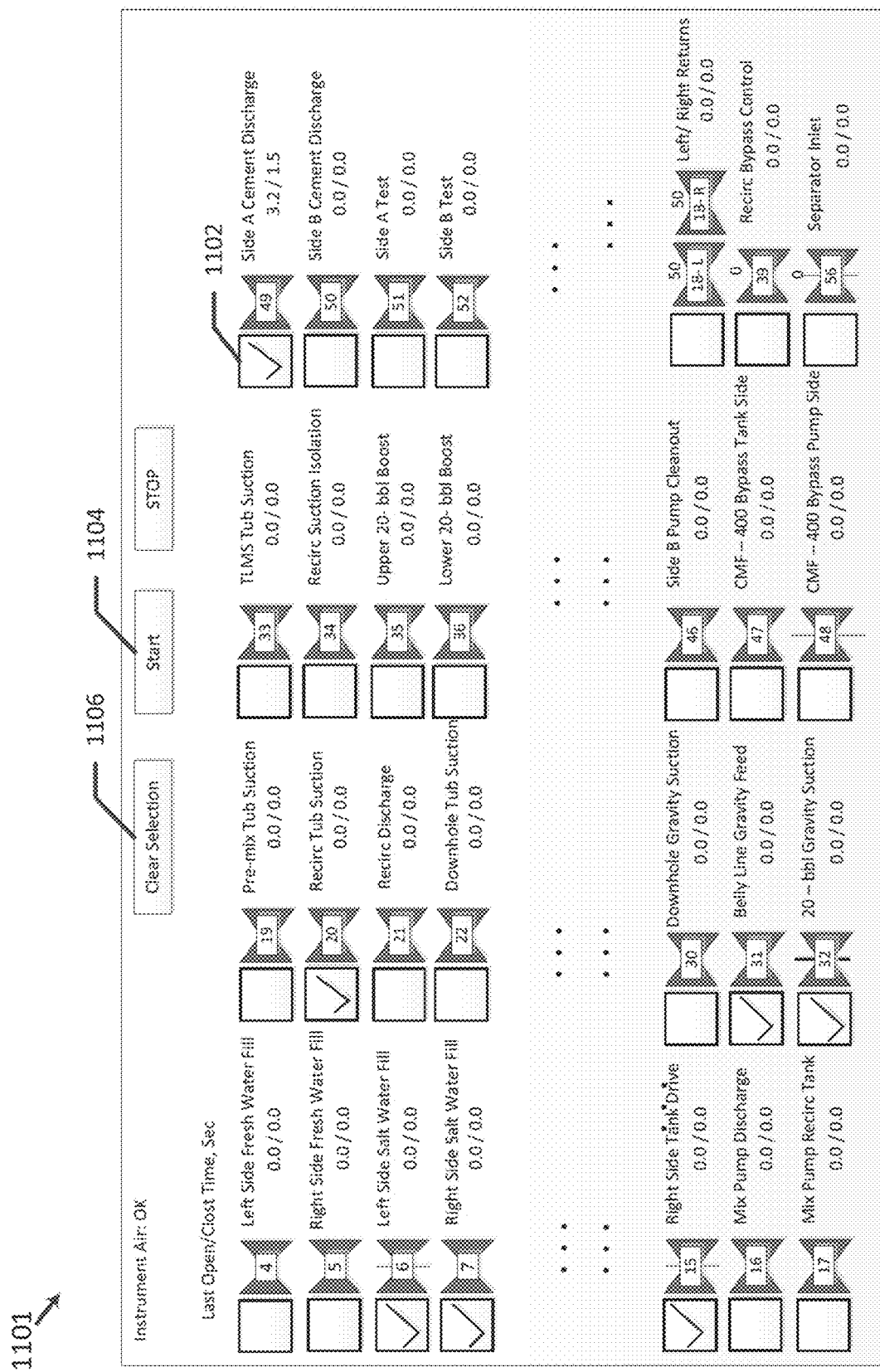
FIG. 11 is an example operator screen for the valve check in FIG. 10.

FIG. 11 is an example display 1101 for a valve check. Using display 1101, the operator may test all operations he/she wishes to implement by checking each valve in order, and opening and closing them via input provided to the display. On display 1101, an icon is shown for each valve with an indication of the current state of the valve. In some examples, the valves may be color coded to indicate the current state of the valve. For example, a valve in an open state may be displayed in green, a valve in a closed state may be displayed in gray, and valve in transition may be displayed in yellow. The operator may check the appropriate boxes to include the associated valves in the test, and clear them to exclude particular valves. In display 1101, the operator may select those six valves having checks in their associated boxes (e.g., valves "6," "7," "15," "20," "31," "32," and "49").

If display 1101 is a touch-sensitive screen, the operator may select a valve by touching a finger or digital pen on the display within a proximity to the box associated with the valve. For example, the operator may touch a fingertip or digital pen within a box 1102, which is associated with "Side A Cement Discharge—valve 49." Additionally, the operator may clear the selection by selecting a user selectable option "Clear Selection" 1106. If control system 168 detects an input selection of user selectable option "Clear Selection" 1106, control system 168 may clear all of the checkmarks from the boxes and the operator may then continue to select the valves again (e.g., from scratch). After selecting the desired valves, the operator may select a user selectable option "Start" 1104 to initiate the valve testing.

Control system 168 may receive a user selection of valves of the list of valves. In an example, control system 168 receives the selection of valves of the list of valves via display 1101 from the operator's input. Control system 168 may conduct a test on these selected valves. Each of the selected valves may be connected in wellbore services manifold system 300 to another valve of the selected valves.

In a step 1004, each valve within the set of valves is simultaneously actuated to transition from a first position to a second position. In some examples, one or more valves is fully closed in the first position and one or more valves is fully open in the second position. Control system 168 simultaneously actuates each valve within the set of valves to transition from a first position to a second position. In some examples, actuating each respective valve includes sending a command to an actuator associated with the respective valve to drive the valve between the two positions. In some examples, control system 78 displays a list of valves on the display to the operator, and the list includes every actuator (or at least some actuators) that is included in wellbore services manifold system 300. An actuator is associated with a valve (e.g., an open/close type valve, a proportional valve, etc.) and sends the associated valve's state to control system 168. The operator may select a plurality of the displayed valves for which the operator would like to check their response times. In this way, the operator may ensure that wellbore services manifold system 300 will be in a good state and operational before the job starts, at least with respect to these selected valves. In some examples, control system 168 progresses through each selected valve and sends open and close commands to the valve's corresponding actuator.

An actuator may receive the open command and open the associated valve. Similarly, an actuator may receive the close command and close the associated valve.

Steps 1006 and 1008 may be performed for each valve within the set of valves to be checked. In a step 1006, for each valve, a first response time based on the transition from the first position to the second position is recorded. In a step 1008, for each valve, it is determined if the first response time for the valve exceeds a first predetermined upper threshold. Control system 168 may receive the first response time from the actuator.

In some examples, control system 168 may actuate each valve within the set to transition from the second position back to the first position and record a second response time based on the transition from the second position back to the first position. Control system 168 may determine if a response time for a valve exceeds a second predetermined upper threshold. Control system 168 may receive the first and second response times from the actuator. Control system 168 may actuate each valve within the set to transition from the second position back to the first position, record a second response time based on the transition from the second position back to the first position and determine if the second response time for the valve exceeds a second predetermined upper threshold. In an example, each valve is fully closed in the first position and the valve is fully open in the second position. Control system 168 may actuate each respective valve by sending a command to an actuator associated with the respective valve to drive the valve between the two positions. Additionally, a display of each valve in the set and an indication whether the first response time exceeds the predetermined response time upper threshold are presented by displaying a visual schematic of the plurality of valves and for each valve in the set, providing a first visual indicator when the first and second response times for the valve are below its associated upper thresholds and a second visual indicator when at least one of the response times for the valve exceeds the associated upper thresholds.

The open and close response times for the respective valves may be recorded. In some examples, control system 168 records the open and close response times for the respective values. The elapsed time for each open and close operation is measured and displayed to the operator. In some examples, the actuator sends a timestamp of the open and close response times to control system 168. For example, an actuator may record the time that an open and/or close command is received and also record the time that the respective valve is opened and/or closed.

The actuator may calculate the open and close response times accordingly. In some examples, the actuator sends an acknowledgement of the opening and closing of the actuators, and control system 168 calculates the open and close response times.

It may be determined whether the open response time for the respective valve satisfies a first predetermined upper threshold and/or whether the close response time for the respective valve satisfies a second predetermined upper threshold. In an example, control system 168 determines whether the first predetermined upper threshold for the respective valve satisfies the open threshold and/or whether the second predetermined upper threshold for the respective valve satisfies the closed threshold. Valves may have different upper thresholds for the open and/or close response times relative to each other. If the open response time for a valve satisfies the corresponding first predetermined upper threshold (e.g., the valve is opened before the open threshold elapses) and the close response time for the valve satisfies the corresponding second predetermined upper threshold (e.g., the valve is closed before the close threshold elapses), then control system 168 may determine that the valve is functioning properly. In contrast, if the open response time for a valve does not satisfy the corresponding first predetermined upper threshold or the closed response time for a valve does not satisfy the corresponding second predetermined upper threshold, then control system 168 may determine that the valve is not functioning properly and identify this valve as a malfunctioning valve.

In a step 1010, a display of each valve in the set and an indication whether the first response time exceeds the predetermined upper threshold are presented. In an example, control system 168 presents a display of each valve in the set and an indication whether the first response time exceeds the predetermined upper threshold. Control system 168 may actuate an alarm when one or more response times exceed the associated predetermined threshold. Further, control system 168 may display adjacent a graphical depiction of each valve the first response time associated with each valve.

In some examples, control system 168 displays adjacent a graphical depiction of each valve the first response time and the second response time associated with each valve. The first visual indicator may be the display of a valve in a first color and the second visual indicator may be the display of a valve in a second color different than the first color. Control system 168 may identify a first predetermined lower threshold for each valve within the set and determine if the first response time for the valve is below the first predetermined lower threshold. Control system 168 may present a display of each valve in the set and an indication whether the first response time exceeds the predetermined response time upper threshold or is below the predetermined lower threshold. In some examples, a wellbore pumping operation may be performed utilizing those valves within the set of valves where both response times for a valve were below the associated upper thresholds. The wellbore pumping operations may include hydraulic fracturing, cementing, acidizing, and overbalancing.

In some examples, control system 168 presents a display of each valve in the set and an indication whether the first response time exceeds the predetermined upper threshold by displaying a visual schematic of the plurality of valves and for each valve in the set, providing a first visual indicator when the valve response time exceeds its associated upper threshold and a second visual indicator when the valve response time is below the associated upper threshold. The first visual indicator may be the display of a valve in a first color and the second visual indicator may be the display of a valve in a second color different than the first color. Additionally, the schematic may be a schematic of a valve manifold and displays the valves' relative positions on the manifold.

In some examples, a report of the selected valves is displayed in accordance with the determination of whether the open response time for the respective valve satisfies a first predetermined upper threshold and/or whether the close response time for the respective valve satisfies a second predetermined upper threshold. In an example, control system 168 displays the report of the selected valves in accordance with the determination of whether the open response time for the respective valve satisfies the first predetermined upper threshold and/or whether the close response time for the respective valve satisfies the second predetermined upper threshold. Control system 168 may indicate whether the valve is functioning properly with respect to its open time and/or close time. The valve response timing for opening and closing the valves is displayed and logged so that trends, over time, can be seen in valve response to provide possible failure and maintenance schedule information. Control system 168 may present an alarm to the operator to alert the operator of malfunctioning valves. The alarm may indicate that particular valves are malfunctioning, or there is a possible obstruction preventing the valve from opening or closing within the predetermined upper threshold of time.

Additionally, if a valve's open or close response time is close to its associated predetermined upper threshold, control system 168 may provide a warning to the operator that this particular valve is functioning properly, but may be problematic in the future. For example, if the valve satisfies the open threshold but is within 0.001 milliseconds of the associated predetermined upper threshold, control system 168 may provide an alert to the operator that this valve is functioning properly, but is at risk of malfunctioning on the job. With the valve response timing information available and archived, control system 168 may use this information to provide a more efficient and cost-effective maintenance schedule for replacing actuators and valves.

It is understood that additional processes may be inserted before, during, or after steps 1002-1010 discussed above. It is also understood that one or more of the steps of method 1000 described herein may be omitted, combined, or performed in a different sequence as desired.

For example, control system 168 may identify a first predetermined lower threshold for each valve within the set and determine if the first response time for the valve is below the first predetermined lower threshold. Control system 168 may present a display of each valve in the set and an indication whether the first response time exceeds the predetermined response time upper threshold or is below the predetermined lower threshold.

Many different operations may be performed using cementing equipment. For each operation, a large number of valves must be set to the correct positions. In the past, setting valves to perform an operation had been a manual operation, requiring the operator to set each valve individually. As the number of valves increases, the chances of having some valves improperly set also increases. Allowing the operator to manually set valves may lead to errors in the positioning of valves, especially in times when the operator is busy or under stress. Setting valve states individually can lead to more mistakes, such as inadvertently leaving a drain open during a cement job, for instance. It may be desirable to allow the operator of cementing equipment to set the position of a plurality of valves at one time. Doing so may greatly reduce the chances of error, thus improving service quality. The present disclosure provides techniques to set the positions of a plurality of valves (or all valves) at once.

Figure 12:
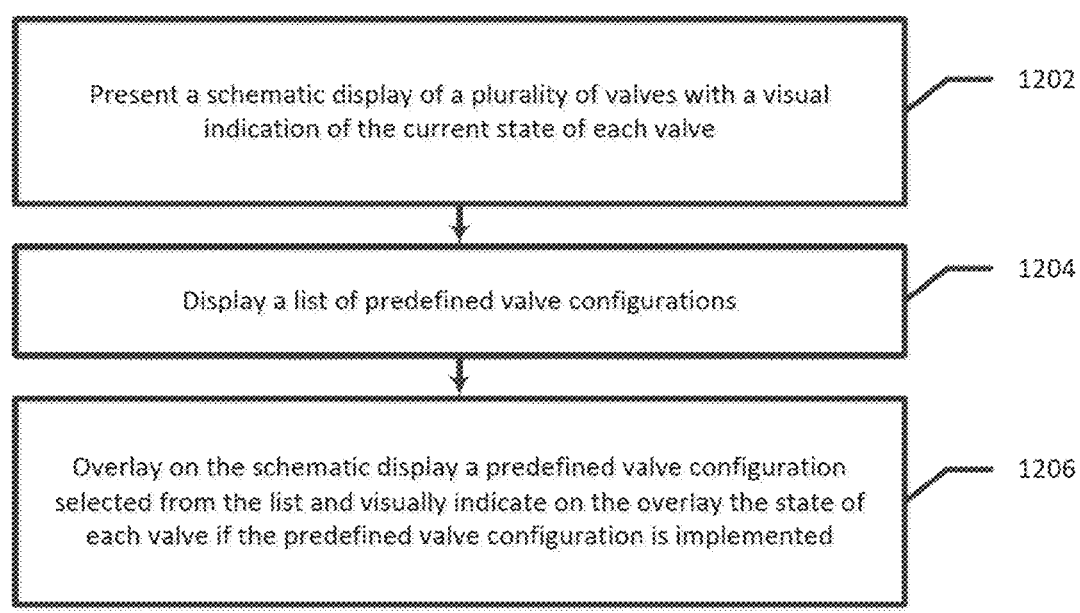
FIG. 12 is an example flowchart of a method of setting a plurality of valves into a predetermined configuration for use in a wellbore servicing operation.

Turning to FIG. 12, steps in an example valve configuration setting method 1200 are illustrated. Method 1200 may be performed to set a plurality of valves into a predetermined configuration for use in a wellbore servicing operation. In some examples, method 1200 is used in a wellbore servicing operation. Method 1200 is not meant to be limiting and may be used in other applications. Control station 168 is utilized to implement a control sequence in order to set a plurality of valves to their proper positions in accordance with a particular valve configuration. The present disclosure allows the operator to choose preset valve configurations for the manifold system based on which job functions should be performed.

In a step 1202, a schematic display of a plurality of valves is presented with a visual indication of the current state of each valve. In an example, control system 168 presents a schematic display of a plurality of valves with a visual indication of the current state of each valve.

Figure 13:
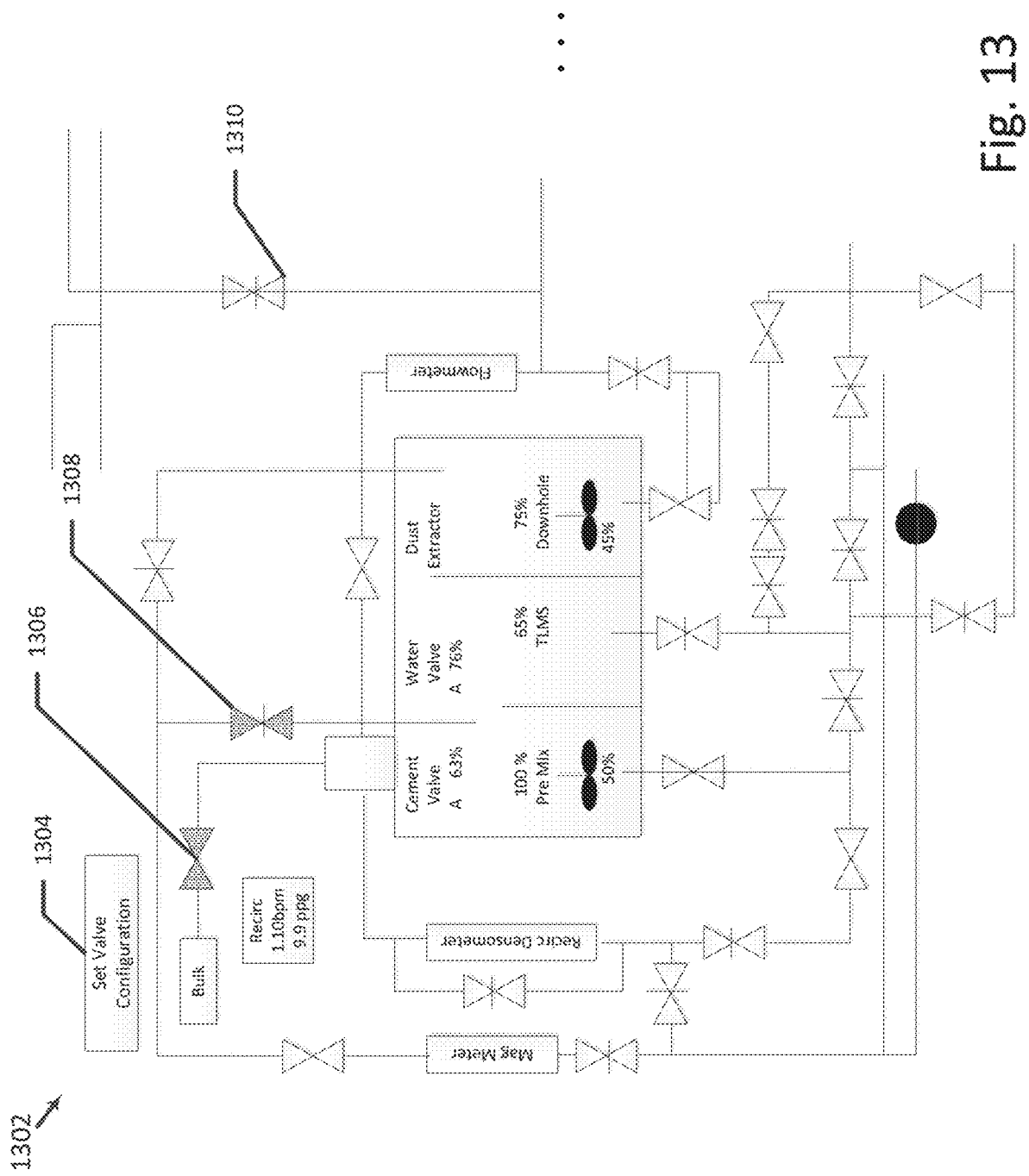
FIG. 13 is an example display of a schematic display including the current states of a plurality of valves.

FIG. 13 is an example schematic display 1302 that is displayed on a display of control system 168. In some examples, schematic display 1302 shows the current state of valves in the current valve configuration (e.g., valves 1306, 1308, and 1310). A valve is illustrated as two facing triangles. For each valve in schematic display 1302, control system 168 may provide a visual indication of the current state of the valve. For example, control system 168 may display a first indicator if the valve is open in the current configuration and display a second indicator different from the first indicator if the valve is closed in the current configuration. In some examples, the valves may be color coded to indicate the current state of the valve. For example, a valve in an open state may be displayed in green or a solid pattern, a valve in a closed state may be displayed in gray or a dotted pattern, and valve in transition may be displayed in yellow or a pinstriped pattern. In some examples, the operator may select a valve in the schematic display in order to be provided with the state of the valve. The operator may open up valves from, for example, tanks to pumps, etc. in an arrangement of manifold systems. The state of plurality of valves 1306, 1308, and 1310 displayed in the schematic display may be controllable via the display of control system 168. In some examples, for safety reasons, valves on the high-pressure side of wellbore services manifold system 300 are not shown in the schematic display, or may be shown but not modifiable by the operator.

Referring back to FIG. 12, in a step 1204, a list of predefined valve configurations is displayed. In an example, control system 168 displays a list of predefined valve configurations to the operator via a display. The list of predefined valve configurations may be for low pressure pumping operations or for high pressure pumping operations. The list of predefined valve configurations may include a plurality of different valve configurations. In some examples, the predefined valve configurations are associated with a wellbore pumping operation selected from the group including hydraulic fracturing, cementing, acidizing, and overbalancing. The list of predefined valve configurations may include valve configurations for at least two different pumping operations selected from the group including hydraulic fracturing, cementing, acidizing, and overbalancing. The list of predefined valve configurations may include multiple different valve configurations for a particular type of wellbore pumping operation.

In some examples, control system 168 receives a request to change wellbore services manifold system 300 from the current valve configuration to a desired valve configuration from the list of predefined valve configurations. In an example, an input selection of a user selectable option to change the current valve configuration of wellbore services manifold system 300 is detected. In FIG. 13, a user selectable option "Set Valve Configuration" 1304 is provided to the operator for selection. The operator may select user selectable option "Set Valve Configuration" 1304 to request that the current valve configuration of wellbore services manifold system 300 be changed.

Figure 14:
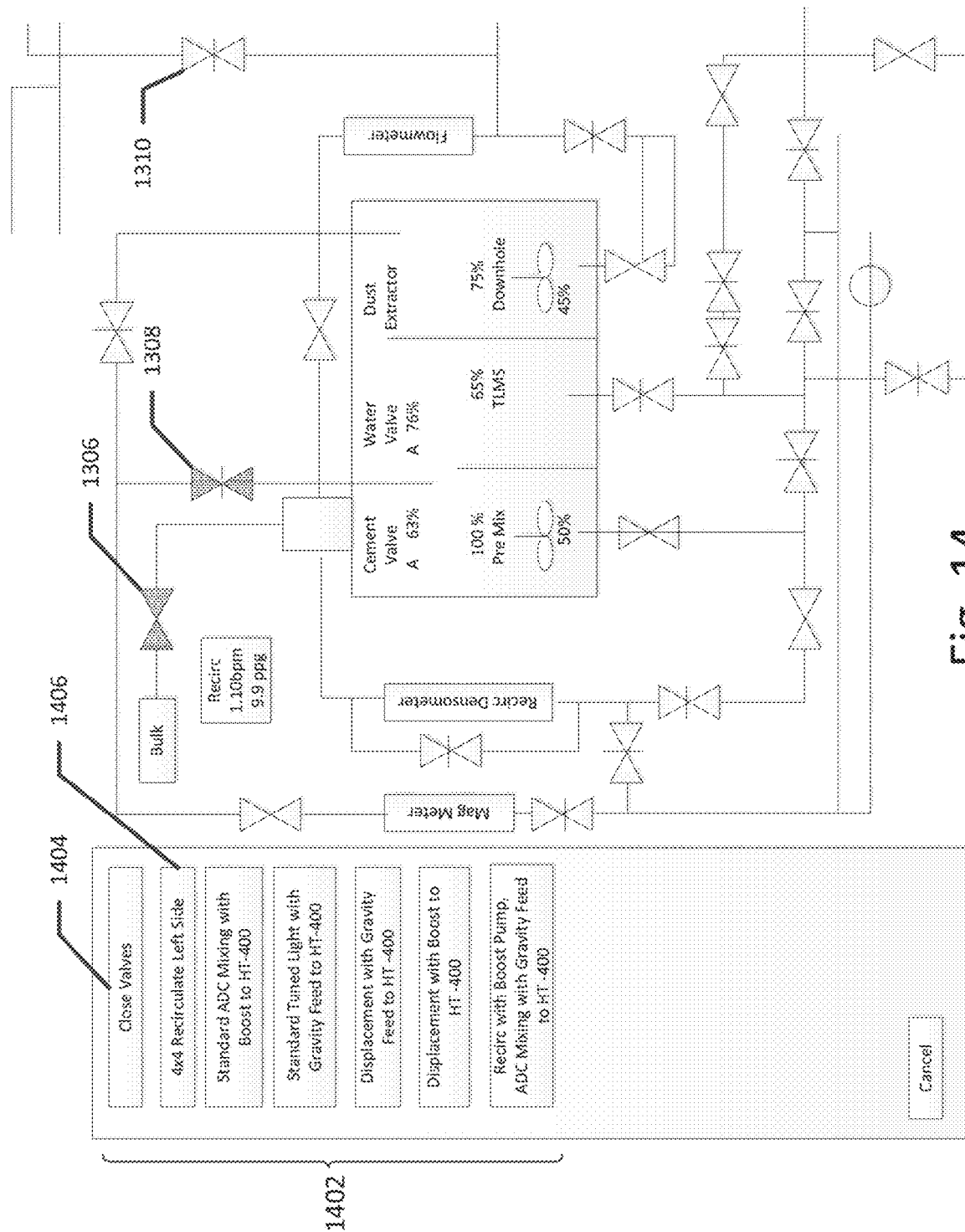
FIG. 14 is an example display of a list of predefined valve configurations that is displayed to the operator.

In some examples, in response to the operator selecting user selectable option "Set Valve Configuration" 1304, control system 168 displays a list of predefined valve configurations on the display for viewing and selection by the operator. FIG. 14 is an example display of a list of predefined valve configurations 1402 that is displayed to the operator. List of predefined valve configurations 1402 includes seven available configurations from which the operator may select. In some examples, the operator is provided with a user selectable option to close all valves. For example, if the operator would like to close all of the valves in the manifold system, the operator may select a user selectable option "Close Valves" 1404. Each valve configuration of list of predefined valve configurations 1402 may have one or more valves in a different state relative to another valve configuration. For example, the valve configuration corresponding to a "4×4 Recirculate Left Side" job 1406 may have some valves that are in the open position, etc., and in a different state compared to their state in "Close Valves" job 1404. To invoke a particular valve configuration, control system 168 may modify the current state of one or more valves in wellbore services manifold system 300 to a different state. The operator may select a desired valve configuration from list of predefined valve configurations 1402. Control system 168 may receive the user selection of the desired valve configuration (the operator's desired valve configuration) of list of predefined valve configurations 1402.

In a step 1206, a predefined valve configuration selected from the list is overlaid on the schematic display and the state of each valve if manipulated as requested is visually indicated on the overlay. In an example, control system 168 overlays on the schematic display a predefined valve configuration selected from the list of predefined valve configurations, and visually indicates on the overlay the state of each valve if the predefined valve configuration is implemented. The overlay and visual indication on the overlay the state of each valve if the predefined valve configuration is implemented may be referred to as a "preview." Additionally, the predefined valve configuration selected from the list may be referred to as the desired valve configuration.

Control system 168 may display a first indicator if the valve is open in the desired configuration and display a second indicator different from the first indicator if the valve is closed in the desired configuration. In some examples, the first indicator is overlaid on the valve in a preview if the valve is open in the desired configuration, and the second indicator is overlaid on the valve in the preview if the valve is closed in the desired configuration. In the overlay, control system 168 may display a "preview" of which valves will remain in the same or different positions if the manifold system is transitioned from the current valve configuration to the desired valve configuration. The desired valve configuration has at least one valve that is in a different state relative to the valve's position in the current valve configuration. The state of a valve in the current valve configuration may be the same as or different from the state of the same valve in the desired valve configuration. For example, a valve that is closed in the valve configuration of "Close Valves" 1404 may be open in the valve configuration of "4×4 Recirculate Left Side"1406. It may be helpful to display this information to the operator so that the operator may be able to view which valves' positions will be changed and which will remain the same if the desired valve configuration is invoked in wellbore services manifold system 300.

Control system 168 may indicate on the overlay which valves will have a change in state if the predefined valve configuration is implemented. Control system 168 may visually indicate on the overlay the state of each valve if manipulated as requested by providing a first visual indicator for a valve that will have a closed state and a second visual indicator for a valve that will have an open state upon implementation of the predefined valve configuration. For example, control system 168 may provide a closed visual indicator for a valve that will undergo a change in state from open to close and an open visual indicator for a valve that will undergo a change in state from closed to open upon implementation of the predefined valve configuration.

Control system 168 may present a schematic display of a plurality of valves, select a desired state for each valve to generate a new predefined valve configuration, and include the new predefined valve configuration on the displayed list. The new predefined valve configuration may also be referred to as the desired valve configuration. Control system 168 may accept the predefined valve configuration displayed on the overlay and automatically actuate the valves to drive them to the state indicated by the selected predefined valve configuration. Control system 168 may accept the predefined valve configuration in response to an operator accepting the new predefined valve configuration. In some examples, control system 168 may perform a wellbore pumping operation utilizing the plurality of valves. The wellbore pumping operations are selected from the group including hydraulic fracturing, cementing, acidizing, and overbalancing.

It is understood that additional processes may be inserted before, during, or after steps 1202-1206 discussed above. It is also understood that one or more of the steps of method 1200 described herein may be omitted, combined, or performed in a different sequence as desired.

In some examples, it is determined whether an operator's request to change the manifold system from a current valve configuration to a desired valve configuration has been confirmed by the operator. In some examples, control system 168 determines whether the request to change wellbore services manifold system 300 from the current valve configuration to the desired valve configuration has been confirmed by the operator. Control system 168 may display a prompt to the operator requesting confirmation of the valve configuration change.

In response to a determination that the request to change the manifold system from the current valve configuration to the desired valve configuration has not been confirmed by the operator, then the current state of the valves is maintained. In this example, the operator has opted to cancel the request to change the manifold system from the first valve configuration to the desired valve configuration, and the control system 168 may accordingly discard this request. In contrast, in response to a determination that the request to change the manifold system from the current valve configuration to the desired valve configuration has been confirmed by the operator, control system 168 may accept the desired valve configuration displayed on the overlay and automatically actuate the valves to drive them to the state indicated by the desired valve configuration. In this example, the operator has confirmed the request to change the manifold system from the current valve configuration to the desired valve configuration. Control system 168 sets the one or more valves of the plurality of valves in the manifold system in accordance with the desired valve configuration. In some examples, control system 168 may actuate the appropriate valves to an opened or closed position to reach the desired valve configuration, depending on the valves' positions in the current valve configuration.

Figure 15:
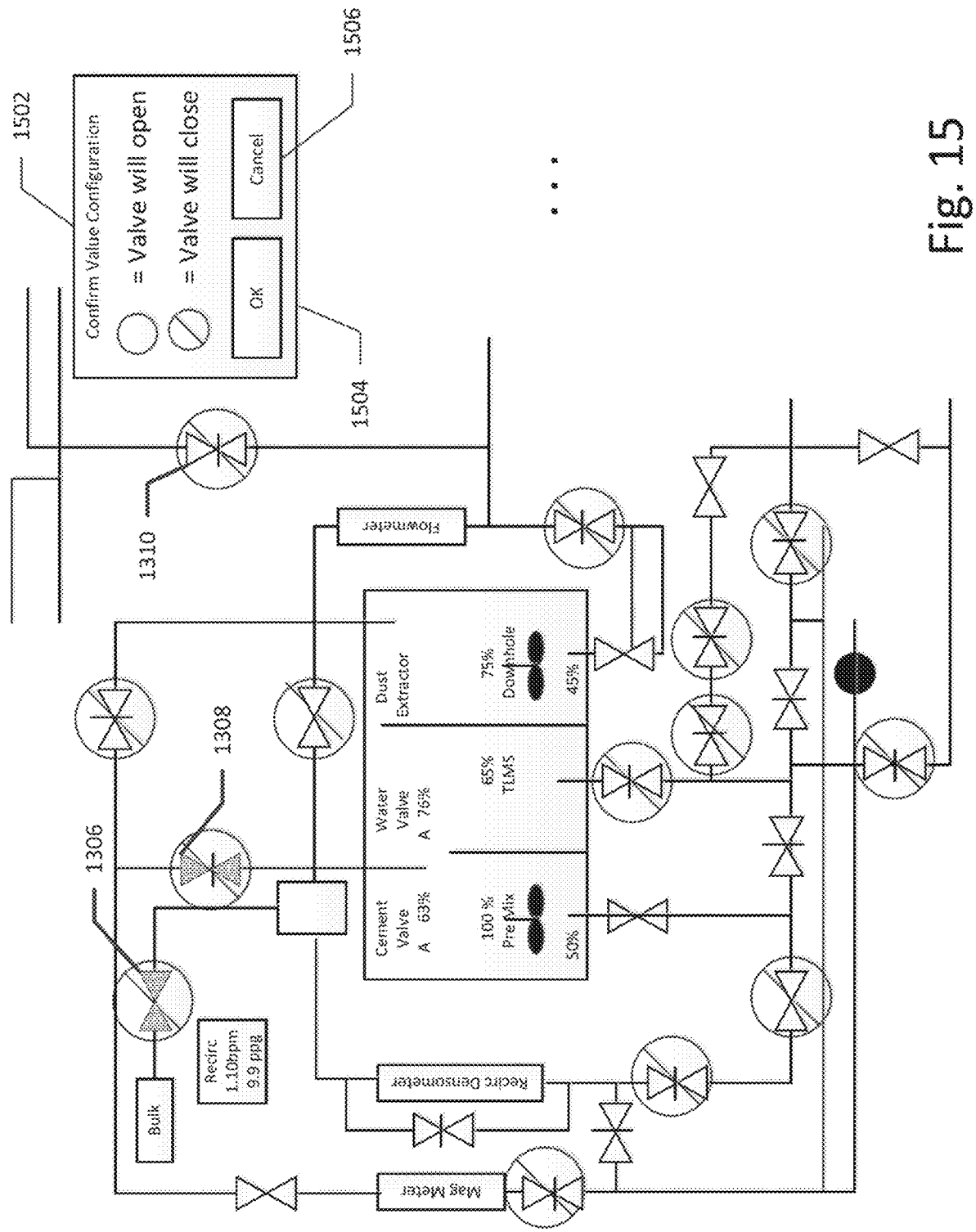
FIG. 15 is an example display of a preview of the desired configuration overlaid on the schematic display in FIG. 14.

FIG. 15 is an example display of the predefined valve configuration selected from the list overlaid on the schematic display in FIG. 14. FIG. 15 shows a preview of which valves' positions would change if the desired valve configuration were invoked in wellbore services manifold system 300. In some examples, control system 168 identifies a valve in the current valve configuration that corresponds to the same valve in the desired valve configuration, where the valve may be in the same position or different positions in the current and desired valve configurations.

Control system 168 may display a first symbol over a given valve if its state will be open in the desired valve configuration and may display a second symbol over the given valve if its state will be closed in the desired valve configuration. In FIG. 15, a circle around a valve and without a slash through the circle indicates that the valve will be opened after invoking the desired valve configuration in the manifold system. A circle around a valve and with a slash through the circle indicates that the valve will be closed after invoking the desired configuration in the manifold system. If a valve is in the open position in the current valve configuration and has a circle without a slash overlaid on the valve, the valve remains in the open position if wellbore services manifold system 300 transitions from the current valve configuration to the desired valve configuration. If a valve is in the open position in the current valve configuration and has a circle with a slash overlaid on the valve, the valve does not remain in the same position. In this case, the valve transitions from the open position to the close position if wellbore services manifold system 300 transitions from the current valve configuration to the desired valve configuration.

If a valve is in the close position in the current valve configuration and has a circle with a slash overlaid on the valve, the valve remains in the close position if wellbore services manifold system 300 transitions from the current valve configuration to the desired valve configuration. If a valve is in the close position in the current valve configuration and has a circle without a slash overlaid on the valve, the valve does not remain in the same position. In this case, the valve transitions from the close position to the open position if wellbore services manifold system 300 transitions from the current valve configuration to the desired valve configuration. In some examples, control system 168 may display a first indicator if the valve is in the same position in the current and desired valve configurations, and may display a second indicator different from the first indicator if the valve is in a different position in the current and desired valve configurations.

In FIG. 15, a confirmation box 1502 requests the operator to confirm or cancel the request to invoke the desired valve configuration in the manifold system. Confirmation box 1502 also includes a legend indicating that a circle with a line through it indicates that the valve underneath the circle will be in the closed state if the desired configuration is applied. If the valve underneath a circle with a line through it is currently in the closed state, then the state of the valve remains unchanged if the desired configuration is applied. In contrast, if the valve underneath a circle with a line through it is in an open state, then the state of the valve is changed if the desired configuration is applied. In particular, the valve transitions from the open state to the closed state. Additionally, a circle without a line through it indicates that the valve underneath the circle will be in the open state if the desired configuration is applied. If the valve underneath a circle without a line through it is in an open state, then the state of the valve remains unchanged if the desired configuration is applied. In contrast, if the valve underneath a circle without a line through it is in a closed state, then the state of the valve is changed if the desired configuration is applied. In particular, the valve transitions from the closed state to the open state.

Confirmation box 1502 provides two user selectable options "OK" 1504 and "Cancel" 1506 to the operator for selection. The operator may preview the changes that would be made based on invoking a change in the manifold system to implement the desired valve configuration from the current valve configuration. The operator may approve the valve configuration change by selecting user selectable option "OK" 1504 (e.g., with a single button press). In response to the operator's selection of user selectable option "OK" 1504, control system 168 may send the appropriate commands (e.g., open or close) to the actuators associated with the appropriate valves to set the valves to match the second valve configuration. In some examples, if the operator confirms the desired valve configuration, all the valves that are moving but are not in the appropriate target may turn yellow on screen for the transition and then will go to the state ending in the target state. If the operator selects user selectable option "Cancel" 1506, then operator is requesting to cancel the request to change the manifold system from the current valve configuration to the desired valve configuration. Accordingly, control system 168 may discard the request to change the manifold system from the current valve configuration to the desired valve configuration, and may switch the system back to a normal operation.

In some embodiments, the operator may manually set the valves to an open or close state in accordance with a desired configuration and then save that desired configuration so that it can be selected from list of predefined valve configurations 1502 in the future.

Although the above may describe the pressure operations in the context of cementing processes, this is not intended to be limiting, and the present disclosure may be used in the context of any pressure pumping processes. For example, the present disclosure is applicable to any equipment with electronically controlled actuated high-pressure valves arranged in such a manner as to create a discharge manifold and which direct flow from different high-pressure pumps to different outlets. For example, the techniques in the disclosure may be used in other oil and gas processes or downhole processes (e.g., hydraulic fracturing) or in other treatments of a wellbore.

Thus, various embodiments of a method, system, and machine-readable medium for servicing a request to manipulate a valve in a manifold system have been described. These embodiments of the method, system, and machine-readable medium may generally include receiving a plurality of valve configurations for the plurality of valves that would result in an overpressured manifold system; receiving a request to manipulate the valve in the manifold system; determining whether a pump to the manifold system is operating; in response to a determination that the pump to the manifold system is operating, determining whether the proposed valve manipulation would inhibit a flow path between the pump and an outlet of the manifold system based on the received overpressured manifold system valve configurations; and in response to a determination that the proposed valve manipulation would inhibit the flow path and would result in an overpressured manifold system, blocking the proposed valve manipulation. The request to manipulate the valve may be a request to open the valve or close the valve.

For any of the foregoing embodiments, the method, system, and machine-readable medium may include any one of the following elements, alone or in combination with each other:

Any embodiment may include in response to a determination that the proposed valve manipulation would not inhibit the flow path, manipulating the valve in accordance with the request.

Any embodiment may include in response to the determination that the proposed valve manipulation would inhibit the flow path and would result in an overpressured manifold system: determining whether a set of safety checks has been overridden; in response to a determination that the set of safety checks has been overridden, manipulating the valve in accordance with the request; and in response to a determination that the set of safety checks has not been overridden: blocking the proposed valve manipulation; providing a warning regarding the inhibited flow path to an operator; providing an override option to the operator; determining whether the operator has selected the override option.

Any embodiment may include in response to a determination that the operator has selected the override option, overriding the set of safety checks.

Any embodiment may include in response to a determination that the operator has selected the override option, manipulating the valve in accordance with the request.

Any embodiment may include in response to a determination that the operator has not selected the override option, discarding the request to manipulate the valve.

Any embodiment may include receiving a request to operate the pump; and determining whether the valve configuration once manipulated as requested matches one of the plurality of valve configurations that would result in an overpressured manifold system.

Any embodiment may include in response to a determination that the manipulated valve configuration matches a valve configuration that would result in an overpressured manifold system: determining whether a set of safety checks has been overridden; in response to a determination that the set of safety checks has been overridden, startin the pump in accordance with the request; and in response to a determination that the set of safety checks has not been overridden: blocking the proposed pump operation; providing a warning regarding an unacceptable flow path to the operator; providing an override option to the operator; and determining whether the operator has selected the override option.

Any embodiment may include in response to a determination that the operator has selected the override option, overriding the set of safety checks.

Any embodiment may include in response to a determination that the operator has selected the override option, starting the pump.

Any embodiment may include in response to a determination that the operator has not selected the override option, determining to not start the pump.

Any embodiment may include in response to a determination that a flow path exists that would not result in an overpressured manifold system, starting the pump.

Any embodiment may include in response to a determination that the operator has not selected the override option, maintaining the pump in its current state.

Any embodiment may include in response to a determination that the pump to the manifold system is not operating, manipulating the valve in accordance with the request.

Additionally, various embodiments of a method, system, and machine-readable medium for performing a valve check on a plurality of valves utilized in a wellbore servicing operation have been described. These embodiments of the method, system, and machine-readable medium may generally include identifying a set of valves to be checked from the plurality of valves; simultaneously actuating each valve within the set to transition from a first position to a second position; for each valve, recording a first response time based on the transition from the first position to the second position and determining if the first response time for the valve exceeds a first predetermined upper threshold; and presenting a display of each valve in the set and an indication whether the first response time exceeds the predetermined response time upper threshold. The request to manipulate the valve may be a request to open the valve or to close the valve.

Any embodiment may include presenting the display of each valve in the set and an indication whether the first response time exceeds the predetermined response time upper threshold by displaying a visual schematic of the plurality of valves and for each valve in the set, providing a first visual indicator when the valve response time exceeds its associated upper threshold and a second visual indicator when the valve response time is below the associated upper threshold.

Any embodiment may include the first visual indicator being the display of a valve in a first color and the second visual indicator being the display of a valve in a second color different than the first color.

Any embodiment may include the valve being fully closed in the first position and the valve being fully open in the second position.

Any embodiment may include actuating each valve within the set to transition from the second position back to the first position, recording a second response time based on the transition from the second position back to the first position, and determining if the response time for the valve exceeds a second predetermined upper threshold.

Any embodiment may include actuating each respective valve by sending a command to an actuator associated with the respective valve to drive the valve between the two positions.

Any embodiment may include the schematic being a schematic of a valve manifold and displaying the valves' relative positions on the manifold.

Any embodiment may include actuating each valve within the set to transition from the second position back to the first position, recording a second response time based on the transition from the second position back to the first position and determining if the second response time for the valve exceeds a second predetermined upper threshold, where each valve is fully closed in the first position and the valve is fully open in the second position, and where actuating each respective valve includes sending a command to an actuator associated with the respective valve to drive the valve between the two positions, and where presenting the display of each valve in the set and an indication whether the first response time exceeds the predetermined response time upper threshold includes displaying a visual schematic of the plurality of valves and for each valve in the set, providing a first visual indicator when the first and second response times for the valve are below its associated upper thresholds and a second visual indicator when at least one of the response times for the valve exceeds the associated upper thresholds.

Any embodiment may include the first visual indicator being the display of a valve in a first color and the second visual indicator being the display of a valve in a second color different than the first color.

Any embodiment may include performing a wellbore pumping operation utilizing those valves within the set of valves where both response times for a valve were below the associated upper thresholds.

Any embodiment may include the wellbore pumping operations being selected from the group consisting of hydraulic fracturing, cementing, acidizing, and overbalancing.

Any embodiment may include actuating an alarm when one or more response times exceed the associated predetermined threshold.

Any embodiment may include identifying a first predetermined lower threshold for each valve within the set; determining if the first response time for the valve is below the first predetermined lower threshold; and presenting a display of each valve in the set and an indication whether the first response time exceeds the predetermined response time upper threshold or is below the predetermined lower threshold.

Any embodiment may include displaying adjacent a graphical depiction of each valve the first response time associated with each valve.

Any embodiment may include displaying adjacent a graphical depiction of each valve the first response time and the second response time associated with each valve.

Any embodiment may include identifying a first predetermined lower threshold for each valve within the set; determining if the first response time for the valve is below the first predetermined lower threshold; and presenting a display of each valve in the set and an indication whether the first response time exceeds the predetermined response time upper threshold or is below the predetermined lower threshold.

Any embodiment may include receiving the first response time from the actuator.

Any embodiment may include receiving the first and second response times from the actuator.

Additionally, various embodiments of a method, system, and machine-readable medium for setting a plurality of valves into a predetermined configuration for use in a wellbore servicing operation have been described. These embodiments of the method, system, and machine-readable medium may generally include presenting a schematic display of the plurality of valves with a visual indication of the current state of each valve; displaying a list of predefined valve configurations; and overlaying on the schematic display a predefined valve configuration selected from the list and visually indicating on the overlay the state of each valve if the predefined valve configuration is implemented.

Any embodiment may include visually indicating on the overlay the state of each valve by providing a first visual indicator for a valve that will have a closed state and a second visual indicator for a valve that will have an open state upon implementation of the predefined valve configuration.

Any embodiment may include the list of predefined valve configurations being a plurality of different valve configurations.

Any embodiment may include the predefined valve configurations being associated with a wellbore pumping operation selected from the group consisting of hydraulic fracturing, cementing, acidizing, and overbalancing.

Any embodiment may include the list of predefined valve configurations including valve configuration for at least two different pumping operations selected from the group consisting of hydraulic fracturing, cementing, acidizing, and overbalancing.

Any embodiment may include the list of predefined valve configurations including multiple different valve configurations for a particular type of wellbore pumping operation.

Any embodiment may include accepting the predefined valve configuration displayed on the overlay and automatically actuating the valves to drive them to the state indicated by the selected predefined valve configuration.

Any embodiment may include performing a wellbore pumping operation utilizing the plurality of valves.

Any embodiment may include the wellbore pumping operations being selected from the group consisting of hydraulic fracturing, cementing, acidizing, and overbalancing.

Any embodiment may include the predefined valve configurations being for low pressure pumping operations.

Any embodiment may include presenting a schematic display of a plurality of valves, selecting a desired state for each valve to generate a new predefined valve configuration; and including the new predefined valve configuration on the displayed list.

Any embodiment may include overlaying on the schematic display a predefined valve configuration selected from the list and visually indicating on the overlay the state of each valve if the predefined valve configuration is implemented by indicating on the overlay which valves will have a change in state if the predefined valve configuration is implemented.

Any embodiment may include visually indicating on the overlay the state of each valve if the predefined valve configuration is implemented by providing a closed visual indicator for a valve that will undergo a change in state from open to close and an open visual indicator for a valve that will undergo a change in state from closed to open upon implementation of the predefined valve configuration.

Any embodiment may include overlaying on the schematic display a predefined valve configuration selected from the list and visually indicating on the overlay the state of each valve if the predefined valve configuration is implemented by indicating on the overlay which valves will have a change in state if the predefined valve configuration is implemented and providing a closed visual indicator for a valve that will undergo a change in state from open to close and an open visual indicator for a valve that will undergo a change in state from closed to open upon implementation of the predefined valve configuration.

Any embodiment may include displaying a first indicator if the valve is open in the desired configuration; and displaying a second indicator different from the first indicator if the valve is closed in the desired configuration.

Any embodiment may include the first indicator being overlaid on the valve in the preview if the valve is open in the desired configuration, and the second indicator being overlaid on the valve in the preview if the valve is closed in the desired configuration.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

The invention claimed is:

1. A method of performing a valve check on a plurality of valves utilized in a wellbore servicing operation, the method comprising:
   identifying a set of valves to be checked from the plurality of valves;
   simultaneously actuating each valve in the set to transition from a first position to a second position;
   for each valve in the set, recording a first response time based on the transition from the first position to the second position and determining if the first response time for the valve exceeds a first predetermined upper threshold;
   presenting a display of each valve in the set and an indication whether e first response time exceeds the first predetermined upper threshold;
   requesting a proposed valve configuration in which at least one valve in the plurality of valves is manipulated;
   determining that a pump coupled to the plurality of valves is operating;
   determining whether the proposed valve configuration matches one of a plurality of valve configurations identified that would result in an overpressured state of the plurality of valves;
   manipulating the at least one valve to move the plurality of valves to the proposed valve configuration in response to either: determining both that the proposed valve configuration does not result in an overpressured state and that first response time for each valve of the at least one valve is below the first predetermined upper threshold; or determining both that the proposed valve configuration does result in an overpressured state and a set of safety checks has been overridden; and
   prohibiting, while the pump is operating, operation of the pump at a speed that would result in the overpressured state in response to determining that the proposed valve configuration does result in the overpressured state and the set of safety checks has been overridden.

2. The method of claim 1, wherein presenting the display comprises displaying a visual schematic of the plurality of valves, and for each valve in the set, providing a first visual indicator when the valve response time exceeds its associated upper threshold and a second visual indicator when the valve response time is below the associated upper threshold.

3. The method of claim 2, wherein the first visual indicator is the display of a valve in a first color and the second visual indicator is the display of a valve in a second color different than the first color.

4. The method of claim 2, wherein the schematic is a schematic of a valve manifold and displays the valves' relative positions on the manifold.

5. The method of claim 1, further comprising:
   for each valve in the set, actuating the valve to transition from the second position back to the first position, recording a second response time based on the transition from the second position back to the first position, and determining if the second response time for the valve exceeds a second predetermined upper threshold,
   wherein each valve is fully closed in the first position and the respective valve is fully open in the second position,
   wherein actuating each respective valve comprises sending a command to an actuator associated with the respective valve to drive the valve between the two positions, and
   wherein presenting comprises displaying a visual schematic of the plurality of valves, and for each valve in the set, providing a first visual indicator when the first and second response times for the valve are below its associated upper thresholds and a second visual indicator when at least one of the response times for the valve exceeds the associated upper thresholds.

6. The method of claim 5, wherein the first visual indicator is the display of a valve in a first color and the second visual indicator is the display of a valve in a second color different than the first color.

7. The method of claim 5, further comprising:
   displaying a graphical depiction of each valve, and displaying the first response time and the second response time associated with each valve adjacent the graphical depiction of each valve.

8. The method of claim 5, further comprising:
   receiving the first and second response times from the actuator.

9. The method of claim 1, further comprising:
   for each valve in the set, identifying a first predetermined lower threshold and determining if the first response time for the respective valve is below the first predetermined lower threshold; and
   presenting a display of each valve in the set and an indication whether the first response time exceeds the predetermined upper threshold or is below the predetermined lower threshold.

10. The method of claim 1, further comprising:
   performing a wellbore pumping operation utilizing those valves within the set of valves where both response times for a valve were below the associated upper thresholds.

11. The method of claim 10, wherein the wellbore pumping operations are selected from the group consisting of hydraulic fracturing, cementing, acidizing, and overbalancing.

12. The method of claim 1, further comprising:
   actuating an alarm when one or more response times exceed the associated predetermined threshold; and
   providing a warning when the proposed valve configuration would place the plurality of valves in an overpressured state.

13. The method of claim 1, further comprising:
   identifying a first predetermined lower threshold for each valve within the set;
   determining if the first response time for the valve is below the first predetermined lower threshold; and
   presenting a display of each valve in the set and an indication whether the first response time exceeds the predetermined upper threshold or is below the predetermined lower threshold.

14. The method of claim 1, further comprising:
displaying a graphical depiction of each valve, and displaying the first response time associated with each valve adjacent the graphical depiction of each valve.

15. The method of claim 1, wherein the valve is fully closed in the first position and the valve is fully open in the second position.

16. The method of claim 1, further comprising:
for each valve in the set, actuating the valve to transition from the second position back to the first position, recording a second response time based on the transition from the second position back to the first position, and determining if the response time for the valve exceeds a second predetermined upper threshold.

17. The method of claim 1, wherein actuating each respective valve comprises sending a command to an actuator associated with the respective valve to drive the valve between the two positions.

18. The method of claim 17, further comprising:
receiving the first response time from the actuator.

19. A system for performing a valve check on a plurality of valves utilized in a wellbore servicing operation, comprising:
a memory storing information about a plurality of valves in a manifold system; and
one or more processors in communication with the memory and operable to cause the system to:
identify a set of valves to be checked from the plurality of valves;
simultaneously actuate each valve within the set to transition from a first position to a second position;
for each valve in the set, record a first response time based on the transition from the first position to the second position, and determine if the first response time for the valve exceeds a first predetermined upper threshold; and
present a display of each valve in the set and an indication whether the first response time exceeds the predetermined upper threshold;
receive a request to manipulate at least one valve in the plurality of valves to change the plurality of valves from a current valve configuration to a proposed valve configuration;
determining that a pump coupled to the plurality of valves is operating;
determine whether the proposed valve configuration matches one of a plurality of valve configurations identified that would result in an overpressured state of the plurality of valves;
provide a warning in response to determining that the proposed valve configuration results in an overpressured state;
manipulate the at least one valve to move the plurality of valves to the proposed valve configuration in response to determining that an operator has overridden the warning; and
prohibit while the pump is operating, operation of the pump at a speed that would result in the overpressured state in response to determining that the operator has overridden the warning.

20. The system of claim 19, wherein the one or more processors are operable to cause the system to:
display a visual schematic of the plurality of valves; and
for each valve in the set, provide a first visual indicator when the valve response time exceeds its associated upper threshold and a second visual indicator when the valve response time is below the associated upper threshold.

21. The system of claim 19, wherein the one or more processors are operable to cause the system to:
for each valve in the set, actuate the valve to transition from the second position back to the first position, record a second response time based on the transition from the second position back to the first position, and determine if the second response time for the valve exceeds a second predetermined upper threshold, wherein each valve is fully closed in the first position and the respective valve is fully open in the second position;
send a command to an actuator associated with the respective valve to drive the valve between the two positions;
display a visual schematic of the plurality of valves; and
for each valve in the set, provide a first visual indicator when the first and second response times for the valve are below its associated upper thresholds and a second visual indicator when at least one of the response times for the valve exceeds the associated upper thresholds.

22. The system of claim 21, wherein the one or more processors are operable to cause the system to:
display a graphical depiction of each valve, and displaying the first response time and the second response time associated with each valve adjacent the graphical depiction of each valve.

23. The system of claim 19, wherein the one or more processors are operable to cause the system to:
for each valve in the set, identify a first predetermined lower threshold and determine if the first response time for the respective valve is below the first predetermined lower threshold; and
present a display of each valve in the set and an indication whether the first response time exceeds the predetermined upper threshold or is below the predetermined lower threshold.

24. The system of claim 19, wherein the one or more processors are operable to cause the system to:
actuate an alarm when one or more response times exceed the associated predetermined threshold.

25. The system of claim 19, wherein the one or more processors are operable to cause the system to:
identify a first predetermined lower threshold for each valve within the set;
determine if the first response time for the valve is below the first predetermined lower threshold; and
present a display of each valve in the set and an indication whether the first response time exceeds the predetermined upper threshold or is below the predetermined lower threshold.

* * * * *